US011926417B2

United States Patent
Suzuki

(10) Patent No.: US 11,926,417 B2
(45) Date of Patent: Mar. 12, 2024

(54) FLIGHT VEHICLE WITH MOUNTING UNIT HAVING MOVING MEANS, AND MOUNING UNIT

(71) Applicant: AERONEXT INC., Tokyo (JP)

(72) Inventor: Yoichi Suzuki, Tokyo (JP)

(73) Assignee: AERONEXT INC., Tokyo (JP)

( * ) Notice: Subject to any disclaimer, the term of this patent is extended or adjusted under 35 U.S.C. 154(b) by 0 days.

(21) Appl. No.: 17/681,344

(22) Filed: Feb. 25, 2022

(65) Prior Publication Data

US 2022/0274706 A1 Sep. 1, 2022

(30) Foreign Application Priority Data

Feb. 26, 2021 (JP) .................................. 2021-030856

(51) Int. Cl.
*B64C 37/02* (2006.01)
*B64D 1/10* (2006.01)
*B64D 1/22* (2006.01)
*B64U 10/14* (2023.01)
*B64U 10/60* (2023.01)

(52) U.S. Cl.
CPC ................ *B64D 1/10* (2013.01); *B64C 37/02* (2013.01); *B64D 1/22* (2013.01); *B64U 10/14* (2023.01); *B64U 10/60* (2023.01)

(58) Field of Classification Search
CPC ............................ B64U 2101/67; B64C 37/02
See application file for complete search history.

(56) References Cited

U.S. PATENT DOCUMENTS

| D798,961 S | * | 10/2017 | Li | ................................. D21/441 |
| 10,301,016 B1 | | 5/2019 | Bondarev et al. | |
| 2018/0108924 A1 | | 4/2018 | Igarashi | |
| 2020/0094962 A1 | | 3/2020 | Sweeny | |
| 2020/0115054 A1 | * | 4/2020 | Ryan | ........................ B64D 5/00 |
| 2020/0166938 A1 | | 5/2020 | Hafenrichter | |

FOREIGN PATENT DOCUMENTS

| CN | 207917156 U | 9/2018 |
| JP | 2006051841 A | 2/2006 |
| JP | 2018024431 A | 2/2018 |
| JP | 2018149973 A | 9/2018 |
| JP | 2018154307 A | 10/2018 |
| JP | 2020163953 A | 10/2020 |
| WO | 2019009424 A1 | 1/2019 |

OTHER PUBLICATIONS

Aslteam, Design and optimal control of a tiltrotor micro aerial vehicle for efficient omnidirectional flight, Apr. 1, 2020, https://www.youtube.com/watch?v=mBi9mOQaZzQ (Year: 2020).*
Notice of Reasons for Refusal dated Mar. 25, 2021 for Japanese Patent Application No. 2021-030856.

* cited by examiner

*Primary Examiner* — Timothy D Collins
*Assistant Examiner* — Terri L Filosi

(57) ABSTRACT

A flight vehicle capable of improving the accuracy of the arrival position of baggage. The flight vehicle according to the present disclosure includes a mounting unit that holds a mounted object, holds the mounting unit via a string member, and has a moving means including a rotor blade provided between the upper end and the lower end of the mounting unit, when the mounting unit is viewed from the side.

13 Claims, 30 Drawing Sheets

FLIGHT VEHICLE WITH MOUNTING UNIT HAVING MOVING MEANS, AND MOUNING UNIT

TECHNICAL FIELD

The present disclosure relates to a flight vehicle with a mounting unit having a moving means, and a mounting unit.

BACKGROUND ART

In recent years, delivery services using a flight vehicle such as a drone or an unmanned aerial vehicle (UAV) (hereinafter collectively referred to as "flight vehicle") used for various purposes are put to practical use. A flight vehicle equipped with multiple propellers, generally called a multicopter (hereinafter collectively referred to as a multicopter) does not require a runway for takeoff and landing like a general fixed-wing aircraft, it can be operated on a relatively narrow land and is suitable for transportation services such as home delivery.

In the transportation by a multicopter, various methods are being studied as a method of loading a baggage to be transported and a method of disconnecting the baggage. A method of connecting a baggage to the main body of the flight vehicle, disconnecting it after landing and thus performing separation is well known.

In the existing multicopter, in many cases, the connection or disconnection of the baggage is performed by a human hand. In this case, a person needs to be allocated to the delivery destination of the baggage and thus, the operating cost increases. Further, a person may approach or touch the flight vehicle. A multicopter is a precision instrument, and the propeller rotates at high speed during operation. Therefore, it may be accompanied by an injury or a malfunction of the airframe or the like, so that it is desirable to reduce the opportunity for a person to disconnect a baggage. In view of these situations, Patent Literature 1 discloses a baggage separation mechanism which can connect a flight vehicle and a baggage by a string member and release connection between the baggage and the string member without requiring manual operation (for example, see Patent Literature 1).

PRIOR ART

Patent Literature

[Patent Literature 1] U.S. Patent Application Publication No. 2020/0094962

SUMMARY OF THE INVENTION

Technical Problem

In Patent Literature 1, a delivery system which can connect a flight vehicle and a baggage by a cable, lower the baggage by unwinding the cable, and lower only the baggage to the ground has been developed.

During bringing down the baggage, it is desirable for the flight vehicle to hover at a high position to reduce the influence of ground effects or to reduce the likelihood of contact with a person and/or a structure on the ground. However, regions and seasons with strong winds exist outdoors. Depending on the length of the cable to be unwound, it is assumed that the landing position of the baggage may deviate greatly, and it becomes difficult to pinpoint and land the baggage on a narrow site or a port.

Therefore, one object of the present disclosure is to provide a flight vehicle capable of improving the accuracy of the arrival position of baggage with a small increase in weight by providing a mounting unit between the baggage and the cable and providing a moving means in which the mounting unit can move horizontally in the air.

Technical Solution

According to the present disclosure, there is provided a mounting unit and a flight vehicle which comprises the mounting unit that holds a mounted object, holds the mounting unit via a string member, and has a moving means including a rotor blade provided between the upper end and the lower end of the mounting unit, when the mounting unit is viewed from the side.

Advantageous Effects

According to the present disclosure, a flight vehicle and a mounting unit capable of improving the accuracy of the arrival position of baggage can be provided.

DETAILED DESCRIPTION OF THE EMBODIMENTS

Figure 1:
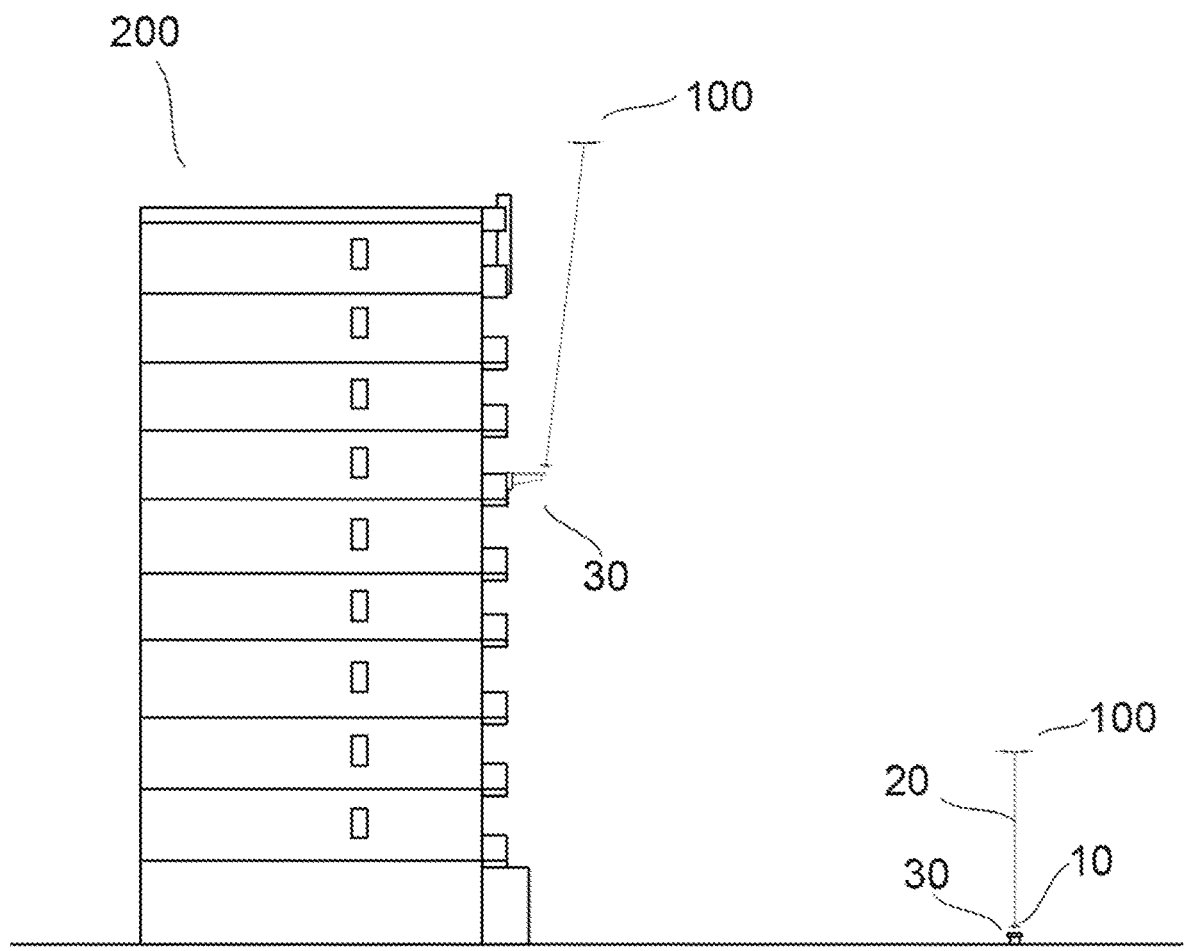
FIG. 1 is a view of a flight vehicle according to the present disclosure at the time of unloading as viewed from the side.
Figure 2:
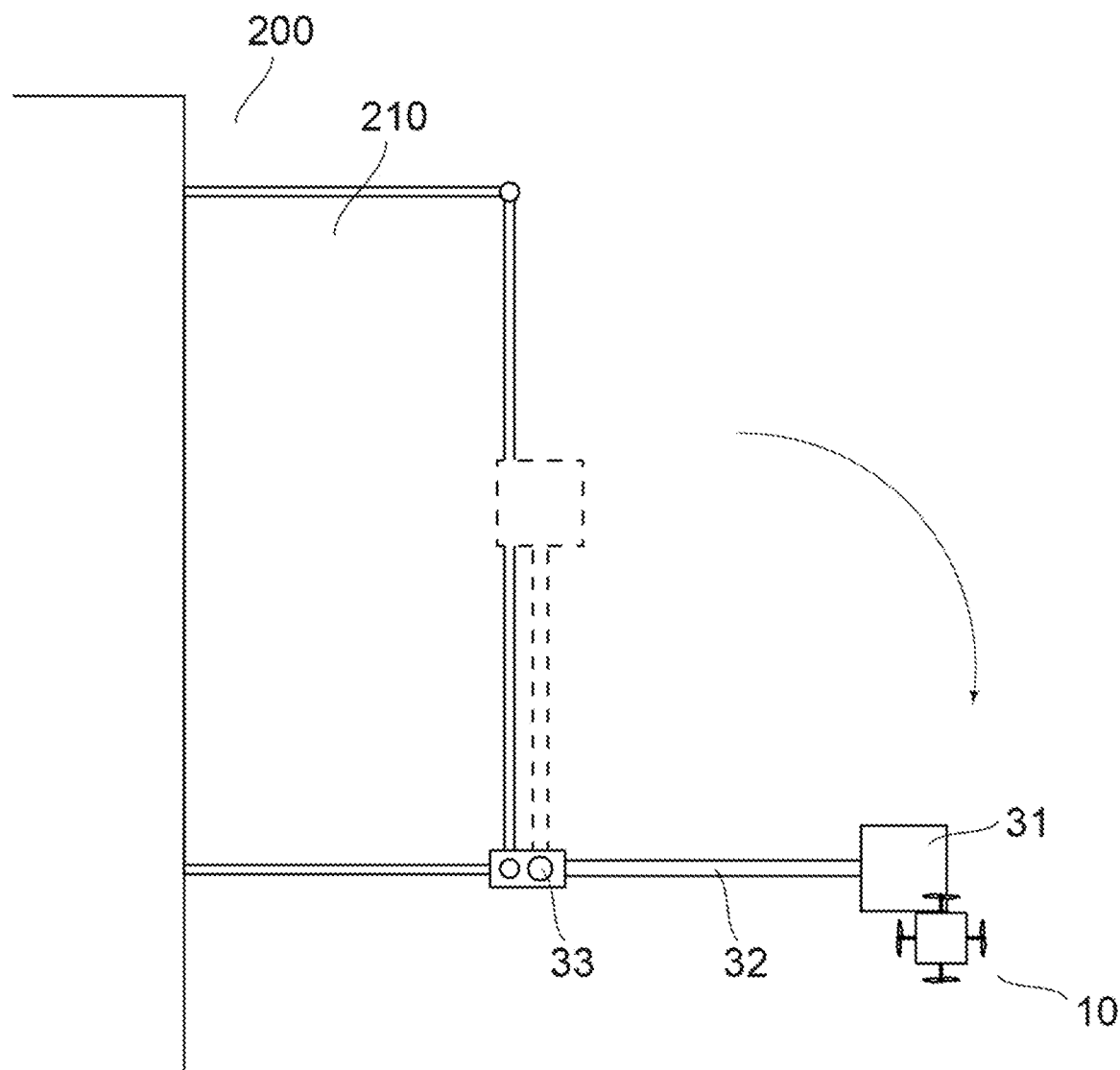
FIG. 2 is a partial top view of the flight vehicle of FIG. 1.

The contents of the embodiment of the present disclosure will be listed and described. A flight vehicle comprising a mounting unit having a moving means according to an embodiment of the present disclosure has the following configuration.

[Item 1]
A flight vehicle, comprising:
a mounting unit that holds a mounted object,
wherein the mounting unit is held via a string member; and
a moving means including a rotor blade provided between the upper end and the lower end of the mounting unit, when the mounting unit is viewed from the side.

[Item 2]
The flight vehicle according to Item 1,
wherein parts of the rotary shafts of the rotor blades are extended in different directions from each other.

[Item 3]
The flight vehicle according to Item 1,
wherein an angle formed by the rotary shaft of at least one of the rotor blades and a horizontal axis is smaller than an angle formed by the rotary shaft and a vertical axis.

[Item 4]
The flight vehicle as in one of Item 1 to 3,
wherein the rotor blades are provided by four or more of even numbers,
wherein the rotary shafts of the two rotor blades arranged diagonally with respect to the mounting unit is extended in the same direction as each other,
wherein the rotary shafts of the rotor blades adjacent to each other around the mounting unit is extended in different directions from each other.

[Item 5]
The flight vehicle as in one of Items 1 to 4,
wherein the string member is branched into two or more from a predetermined position, and is connected to the mounting unit at two or more points.

[Item 6]
The flight vehicle as in one of Items 1 to 5,
wherein the mounting unit is hanged by the string member connected to a hanging mechanism.

[Item 7]
The flight vehicle according to Item 6,
wherein the hanging mechanism is mounted at a position offset at least in the front-rear direction of the flight vehicle from the center of gravity of the flight vehicle or directly above a string member extending from the mounting unit.

[Item 8]
The flight vehicle according to Item 7,
wherein the string member extends from the offset position to the mounting unit via a pulley.

[Item 9]
The flight vehicle as in one of Item 1 to 8,
wherein the mounting unit can be separated from an airframe together with the mounted object.

[Item 10]
A mounting unit that holds a mounted object,
wherein the mounting unit has a moving means including a rotor blade provided between the upper end and the lower end of the mounting unit, when the mounting unit is viewed from the side, and
wherein parts of the rotary shafts of the rotor blades are extended in different directions from each other.

[Item 11]
The mounting unit according to Item 10,
wherein an angle formed by the rotary shaft of at least one of the rotor blades and a horizontal axis is smaller than an angle formed by the rotary shaft and a vertical axis.

[Item 12]
The mounting unit as in Item 10 or 11,
wherein the four rotor blades are provided,
wherein the rotary shafts of the two rotor blades arranged diagonally with respect to the mounting unit area extended in the same direction as each other, and
wherein the rotary shafts of the rotor blades adjacent to each other around the mounting unit are extended in different directions from each other.

Details of Embodiments According to the Present Invention

Hereinafter, a flight vehicle and a mounting unit comprising a mounting unit having a moving means according to the embodiments of the present disclosure will be described with reference to the accompanying drawings.

Details of First Embodiment

As shown in FIG. 1, a flight vehicle according to an embodiment of the present disclosure includes a flight vehicle 100 that takes a flight, a mounting unit 10 that can hold a mounted object 11 to be delivered, and a string member 20 that is connected to the flight vehicle 100 and mounting unit 10 and can be unwound and wound.

Figure 3:
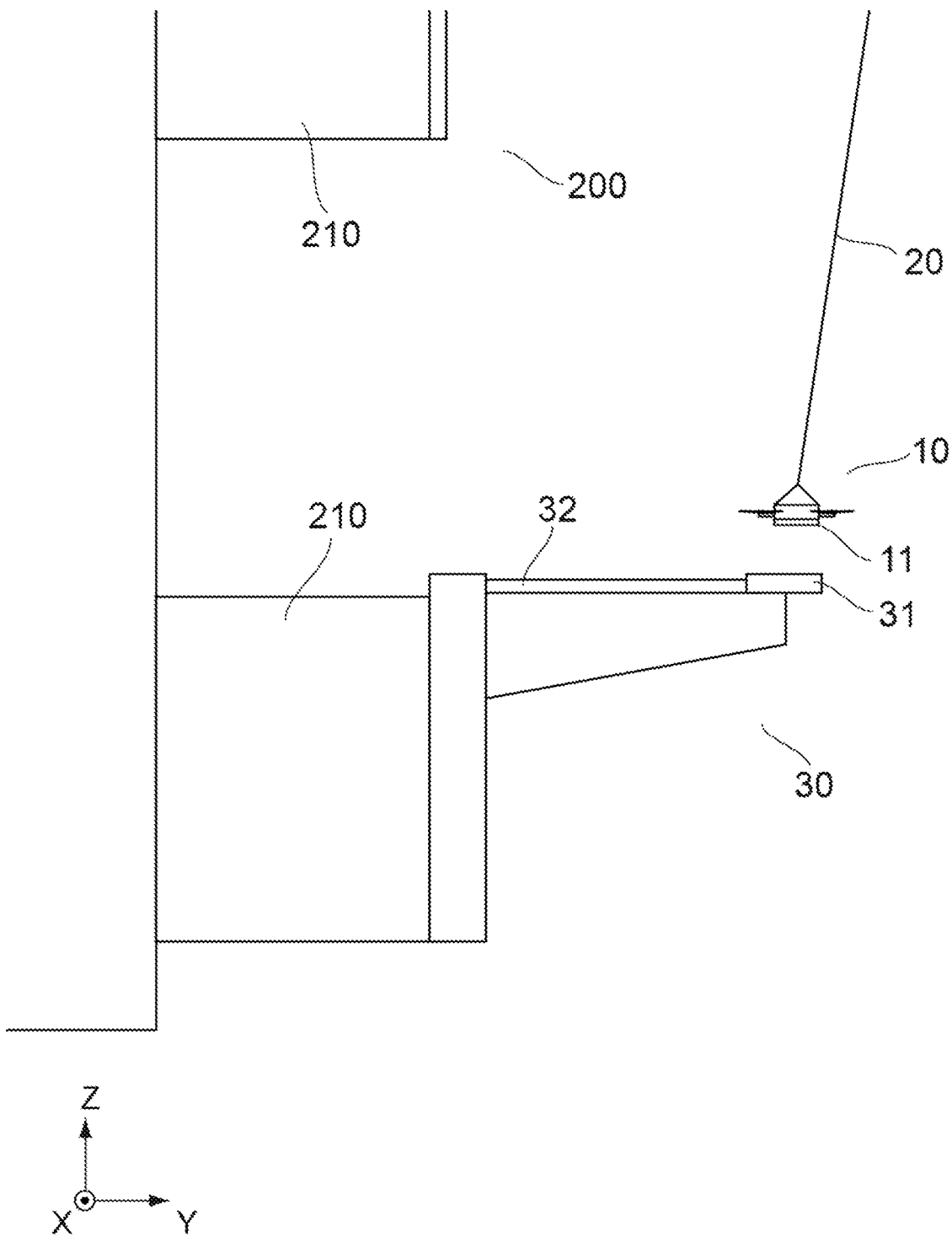
FIG. 3 is a partial side view of the flight vehicle of FIG. 1.
Figure 4:
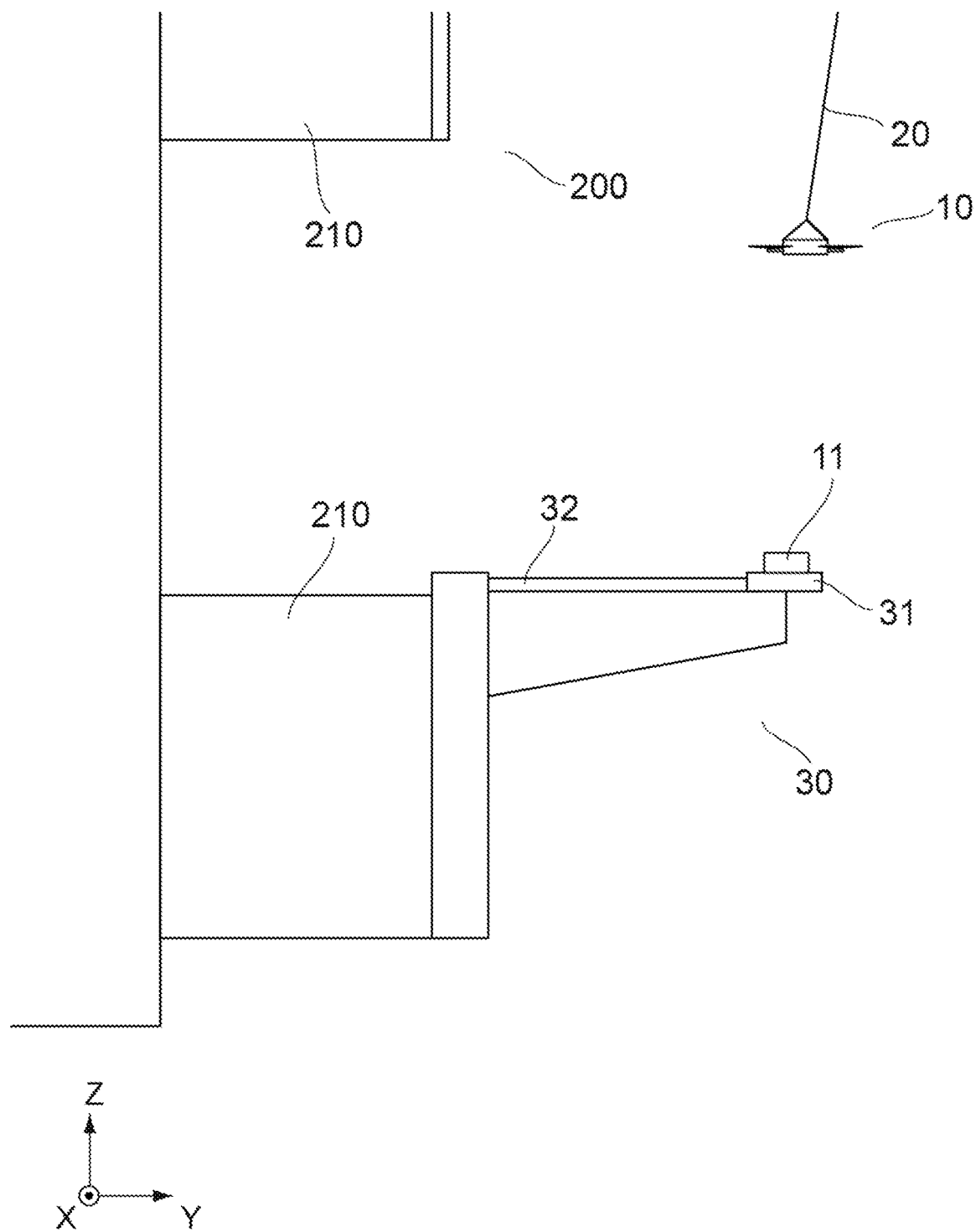
FIG. 4 is a view after the flight vehicle of FIG. 3 has completed unloading.

The flight vehicle 100 mounted with a mounted object to be delivered takes off from the takeoff point and flies to the destination (e.g., port 30, etc.). The flight vehicle 100 that has reached the destination will hover for unloading. After that, as shown in FIGS. 3 and 4, in the flight vehicle the mounting unit and the mounted object are lowered by feeding a string member, and when the mounting unit is lowered to a predetermined position, the mounting unit separates the mounted object and completes the delivery. The mounting unit 10 that has separated the mounted object 11 ascends to the vicinity of the flight vehicle 100 again by winding the string member 20. When the string member 20 ascends to a predetermined position, the flight vehicle 100 starts moving toward the next destination.

Figure 5:
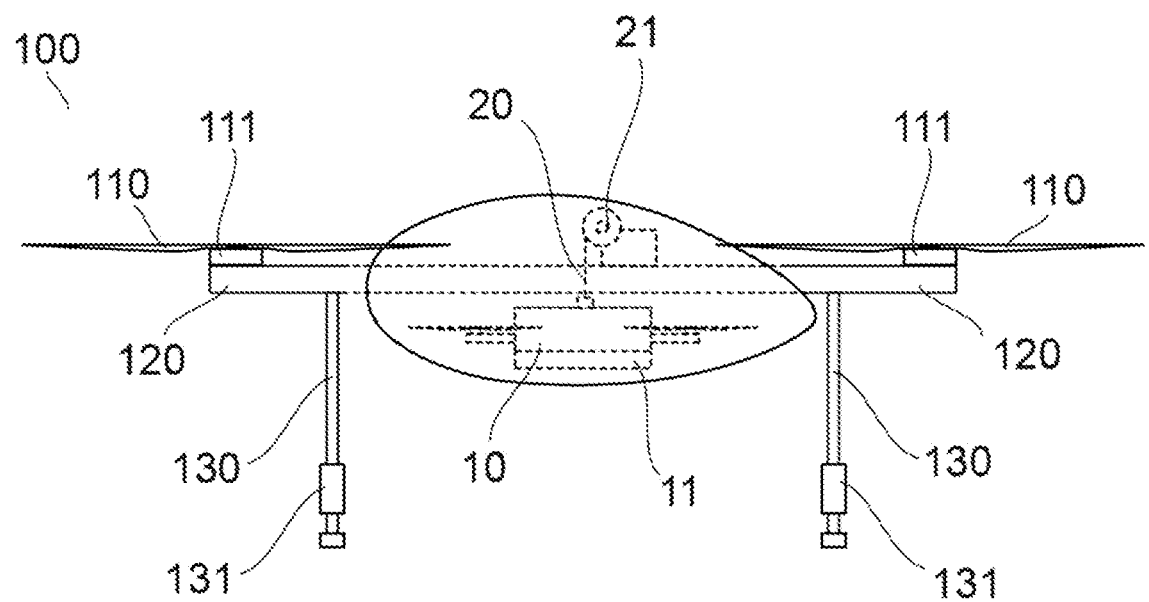
FIG. 5 is a view of the flight vehicle according to the present disclosure as viewed from the side.
Figure 5:
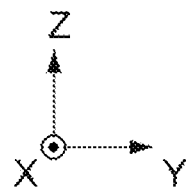

As shown in FIG. 5, the flight vehicle 100 according to the embodiment of the present disclosure comprises, to take a flight, at least a main body, a plurality of rotor blade parts comprising a propeller 110 and a motor 111, and a flight portion that includes elements such as the motor mount and a frame that support the rotor blade parts. It is desirable to mount energy for operating them (for example, secondary battery, fuel cell, fossil fuel, etc.).

Further, the illustrated flight vehicle 100 is simplified and drawn to facilitate the explanation of the structure of the present disclosure. For example, the detailed configuration of the control unit and the like is not shown.

The flight vehicle 100 is moving forward in the direction of arrow D (−Y direction) in the figure (details will be described later).

In the following explanation, terms may be used properly according to the following definitions. Front-back direction: +Y direction and −Y direction, up-down direction (or vertical direction): +Z direction and −Z direction, left-right direction (or horizontal direction): +X direction and −X direction, travel direction (forward): −Y direction, backward direction (rear): +Y direction, ascending direction (upward): +Z direction, descending direction (downward): −Z direction The propeller 110 rotates by receiving an output from the motor 111. By the rotation of the propeller 110, a propulsive force is generated for taking off the flight vehicle 100 from the starting point, moving it, and landing it at the destination. Further, the propeller 110 can rotate in the right direction, stop, and rotate in the left direction.

The propeller 110 included in the flight vehicle of the present disclosure has one or more wings. Any number of blades (rotors) (e.g. 1, 2, 3, 4, or more blades) may be used. Further, the shape of the blade can be any shape such as a flat shape, a curved shape, a twisted shape, a tapered shape, or a combination thereof. The shape of the blade can be changed (for example, expansion/contraction, folding, bending, etc.). The blades may be symmetrical (having the same upper and lower surfaces) or asymmetric (having different shaped upper and lower surfaces). The blades can be formed into an air wheel, wing, or geometry suitable for generating dynamic aerodynamic forces (e.g., lift, thrust) as the blades move through the air. The geometry of the blades can be appropriately selected to optimize the dynamic air characteristics of the blades, such as increasing lift and thrust and reducing drag.

Further, the propeller included in the flight vehicle 100 of the present disclosure may consider a fixed pitch, a variable pitch, or a mixture of the fixed pitch and the variable pitch, without being limited thereto.

The motor 111 causes the rotation of the propeller 110, and for example, the drive unit can include an electric motor, an engine, or the like. The blades are drivable by the motor and rotate around the rotary shaft of the motor (e.g., the major axis of the motor).

The blades can all rotate in the same direction or can rotate independently. Some of the blades rotate in one direction and the other blades rotate in the other direction. The blades can all rotate at the same rotation speed, or can rotate at different rotation speeds. The rotation speed can be automatically or manually determined based on the dimensions (e.g., size, weight) and control state (speed, moving direction, etc.) of the moving body.

The flight vehicle 100 determines the rotation speed and flight angle of each motor according to the wind speed and the wind direction by a flight controller 1001, ESC 112, transreceiver (propo) 1006 or the like. Thereby, the flight vehicle can perform movements such as ascending, descending, accelerating, decelerating, and changing direction.

The vehicle 100 may perform autonomous flight according to a route or rule set in advance or during flight, or flight by manipulation using the transreceiver (propo) 1006.

Figure 8:
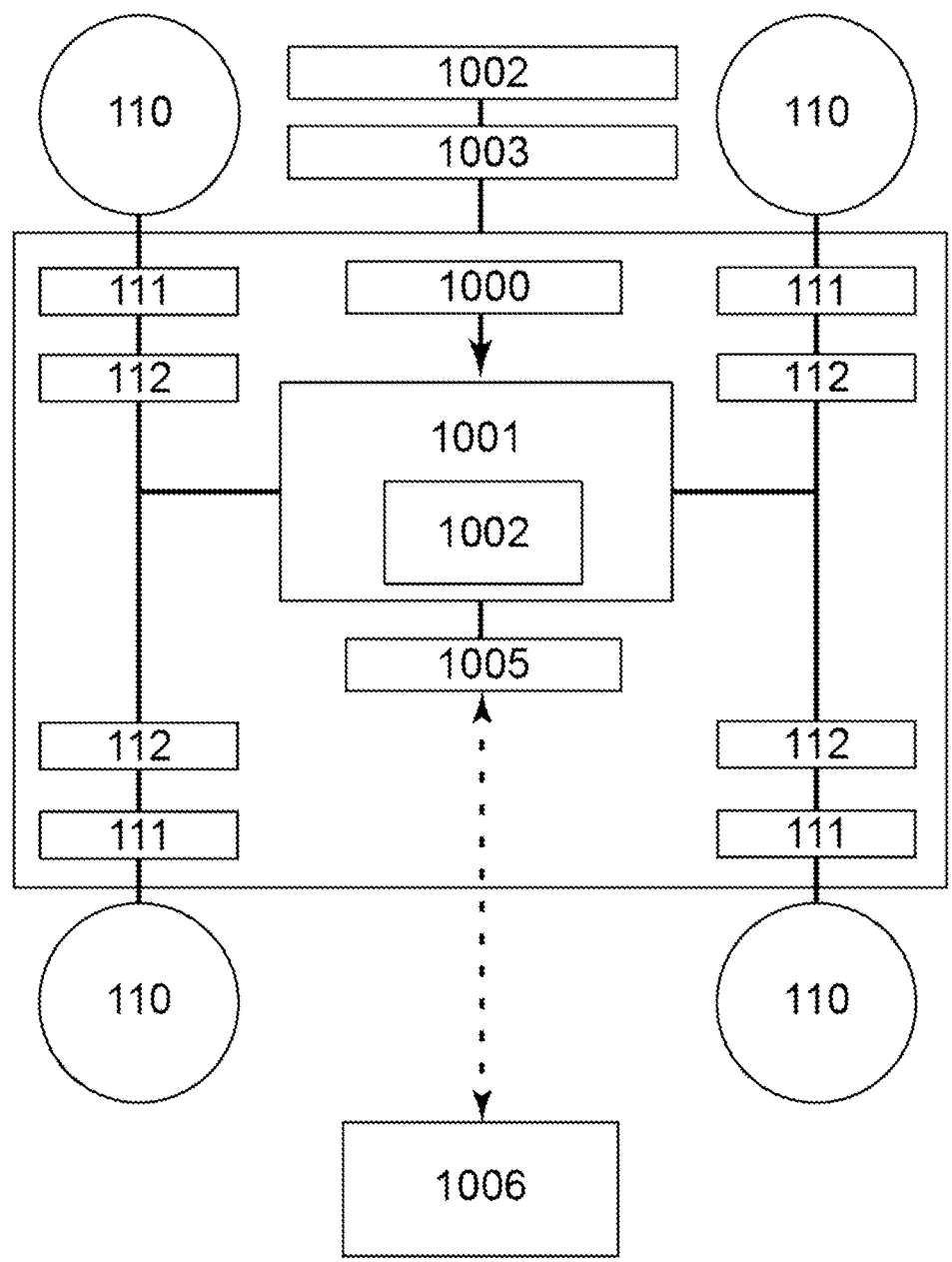
FIG. 8 is a functional block diagram of the flight vehicle of FIG. 1.

The above-described flight vehicle 100 has, for example, a part of or all of a functional block as shown in FIG. 8. In addition, the functional block of FIG. 8 is a minimum reference structure. A flight controller 1001 is a so-called processing device. The processing unit may have one or more processors, such as a programmable processor (e.g., a central processing unit (CPU)). The processing unit has a memory (not shown) and it is possible to access the memory. The memory stores logic, codes, and/or program instructions that can be executed by the flight controller to perform one or more steps. The memory may include, for example, a separable medium such as an SD card or random access memory (RAM) or an external storage device. Data obtained from a sensor, or the like may be transmitted directly to the memory and stored. For example, still image dynamic image data taken by a camera, or the like is recorded in a built-in memory or an external memory.

The processing unit includes a control module configured to control the state of the rotorcraft. For example, the control module may control a propulsion mechanism (motor, etc.) in order to adjust the spatial arrangement, velocity, and/or acceleration of the rotorcraft having six degrees of freedom (translational motions x, y, and z, and rotational motions Ox, Oy, and Oz). The control module can control one or more of the states of a mounted object and sensors.

The processing unit can communicate with a transreceiving part 1005 configured to send and/or receive data from one or more external devices (e.g., a terminal, display device, or other remote controller). The transreceiver 1006 can use any suitable communication means such as wired or wireless communication. For example, the transreceiving part 1005 can use one or more of a local area network (LAN), a wide area network (WAN), infrared, wireless, WiFi, point-to-point (P2P) network, telecommunication network, cloud communication, and the like. The transreceiving part 1005 can transmit and/or receive one or more of, data acquired by sensors 1002, process results generated by the processing unit, predetermined control data, user command from a terminal or a remote controller, and the like.

Sensors 1002 according to the present embodiment may include inertial sensors (acceleration sensors, gyro sensors), GPS sensors, proximity sensors (e.g., LiDAR), or vision/image sensors (e.g., cameras).

Figure 6:
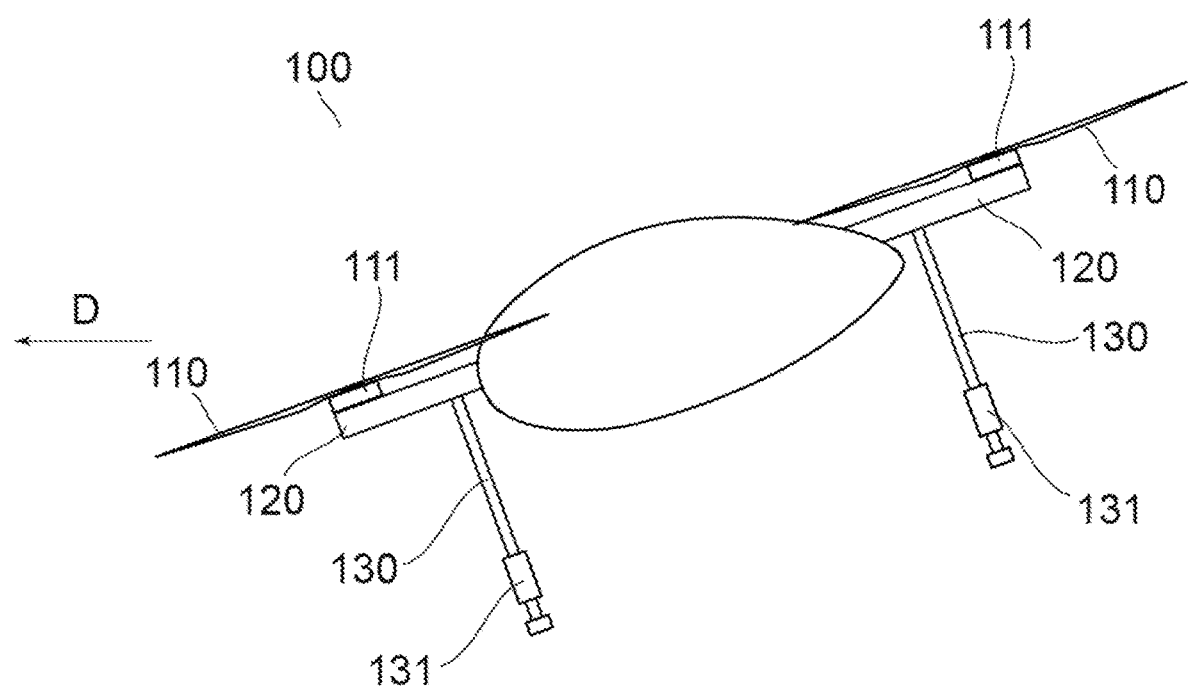
FIG. 6 is a view in flight of the flight vehicle of FIG. 5.
Figure 6:
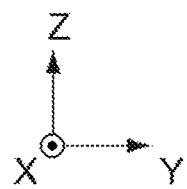
Figure 7:
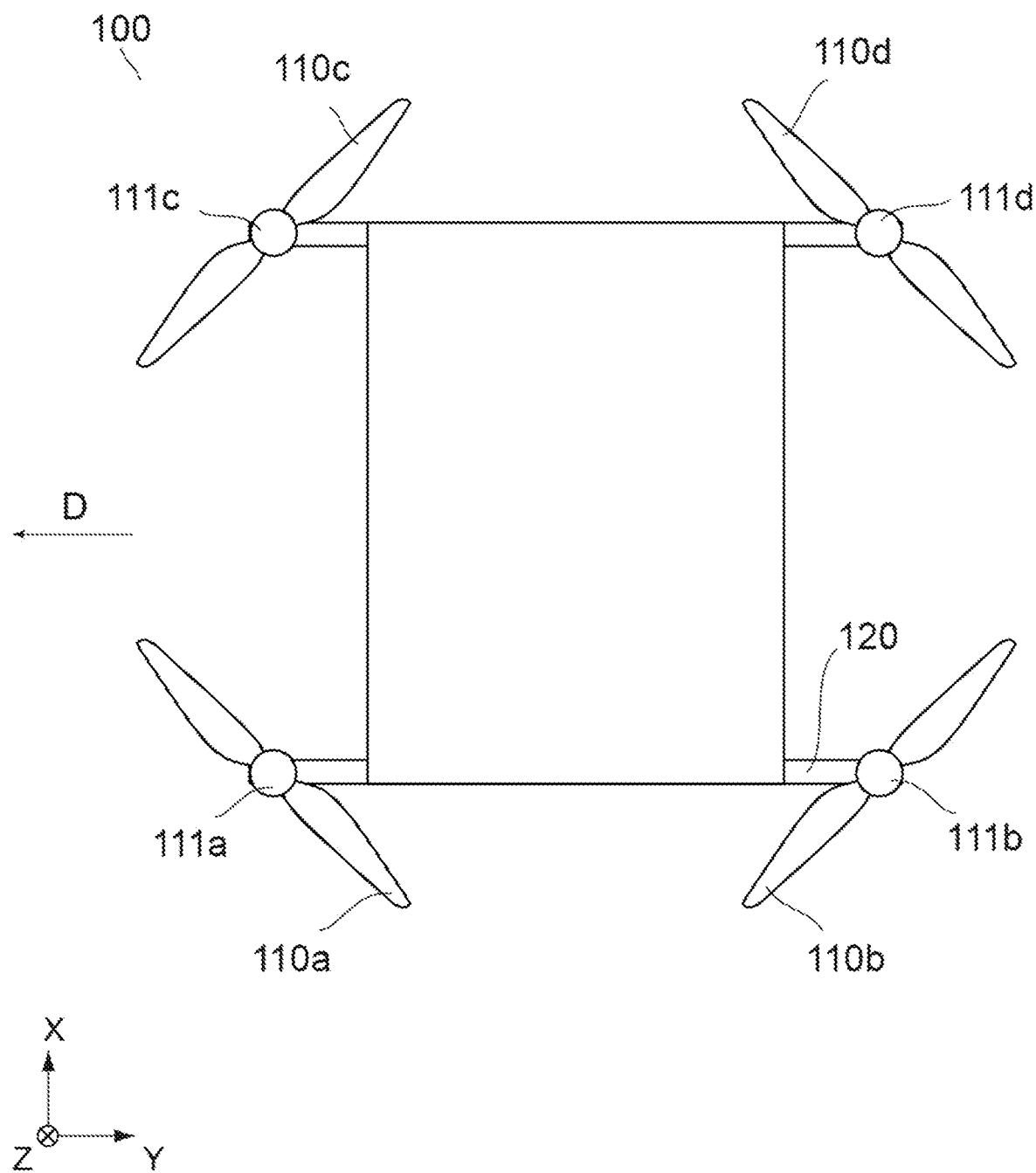
FIG. 7 is a view of the flight vehicle of FIG. 5 as viewed from the top.

As shown in FIGS. 5 and 6, the rotating surface of the propeller 110 included in the flight vehicle 100 according to the embodiment of the present disclosure has an angle inclined forward toward the travel direction during traveling. Lift in the upward direction and thrust in the travel direction are created by the rotating surface of the forward inclined propeller 110, whereby the flight vehicle 100 moves forward.

The flight vehicle 100 includes a main body that can include a processing unit or a battery to be mounted, a mounted object, and the like. The main body is fixedly connected to the flight portion, and the posture of the main body changes as the posture of the flight portion changes. In the posture of the flight vehicle 100 during cruising, which is expected to be maintained for a long time during the movement of the flight vehicle 100, the flight time is effectively shortened by optimizing the shape of the main body and improving the speed.

It is desirable that the main body includes an outer skin that has a strength capable of withstanding flight and takeoff and landing. For example, plastic, FRP, and the like have rigidity and waterproofness, and are therefore suitable as materials for the outer skin. These materials may be the same material as the frame 120 (including an arm) included in the flight portion or may be a different material.

Further, the motor mount, the frame 120, and the main body provided in the flight portion may be configured by connecting each component or may be molded so as to be integrated by using a monocoque structure or an integral molding (for example, the motor mount and the frame 120 are integrally molded, the motor mount, the frame 120 and the main body are integrally molded, etc.). By integrating the parts, it becomes possible to smooth the joint of each part, and thus it is expected that the drag force will be reduced and fuel efficiency will be increased of the flight vehicle such as the blended wing body and the lifting body.

Figure 21:
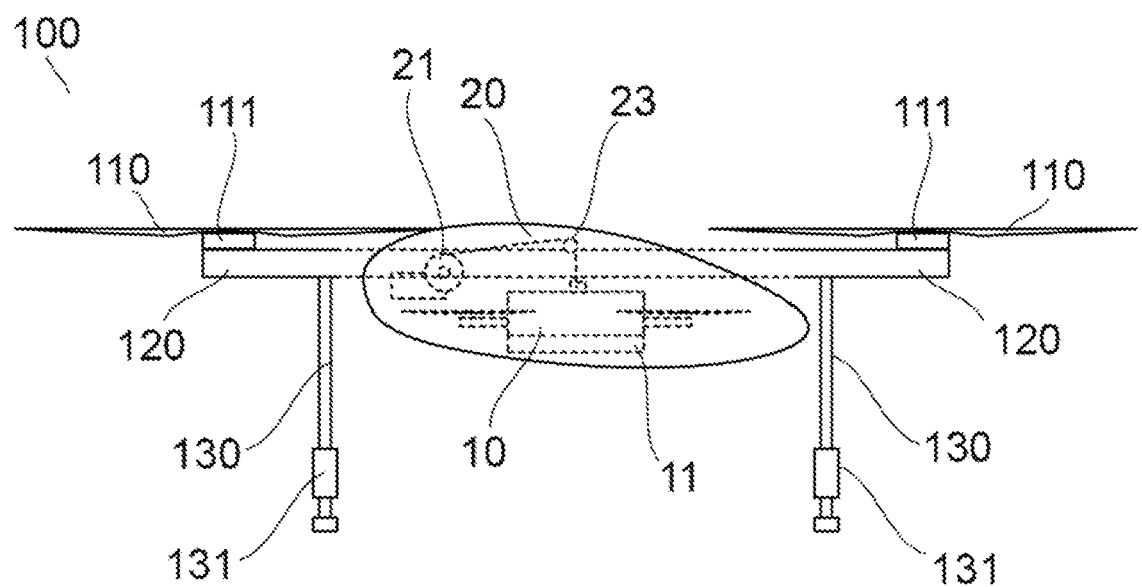
FIG. 21 is a view showing a part of the internal structure of the flight vehicle according to the present disclosure.
Figure 22:
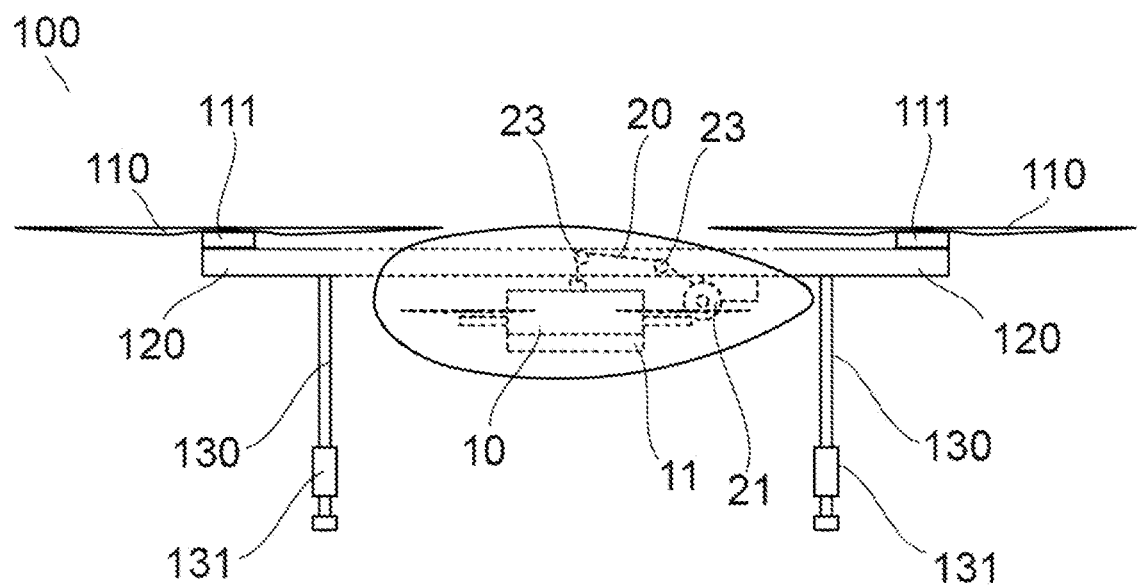
FIG. 22 is another diagram showing a part of the internal structure of the flight vehicle according to the present disclosure.

The shape of the flight vehicle 100 may have directivity. For example, as shown in FIG. 6, FIG. 21 and FIG. 22, there may be mentioned a shape that improves flight efficiency when the nose of the flight vehicle is facing the wind, such as a streamlined main body where the flight vehicle 100 has little drag in the posture when cruising under no wind, etc.

The mounting unit 10 has at least a function of holding the mounted object 11 (a method of holding and separating the mounted object will be described later). Further, in order to make the mounted object 11 take a predetermined posture, the mounting unit 10 and the flight portion may be provided with one or more rotary shafts. Thereby, the mounted object 11 can be displaced independently of the posture of the flight vehicle 100.

Figure 9:
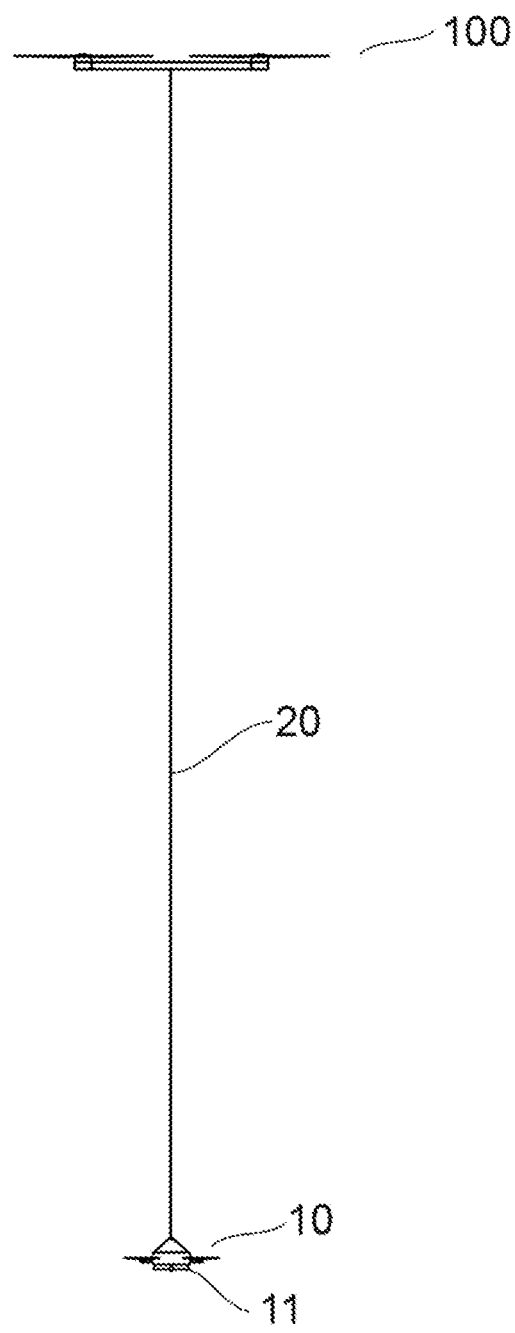
FIG. 9 is a view of a configuration example of a flight vehicle and a mounting unit according to the present disclosure as viewed from the side.

As shown in FIG. 9, the mounting unit 10 is connected to a string member 20. The string member 20 is a long material having flexibility, such as a wire, an electric wire, a fishing line, a rope, a tape, and the like. The material is not limited to the one illustrated, and it is sufficient if it has a strength capable of lifting the mounting unit and the mounted object and can smoothly perform operations such as winding and unwinding on a spool. For example, when an electric wire cable is used, power can be supplied from the flight vehicle 100 to the mounting unit 10.

During the flight, the string member 20 is wound so that the mounting unit 10 is in a predetermined position (for example, the position housed inside the cover as shown in FIG. 5), and the mounting unit 10 can be ascended and descended by feeding or winding the string member 20.

The flight vehicle 100 may have a function of holding the mounting unit 10 in addition to the string member 20. For example, as shown in FIG. 5, in the case of a configuration in which the mounting unit 10 during the flight is located inside the cover of the flight vehicle 100, there is a method of providing a door opening/closing mechanism under the cover. According to the control signal from the flight controller, the door is opened while the mounting unit 10 is ascending and descending, and the door is closed after the mounting unit 10 reaches the inside of the cover, so that the mounting unit 10 is in a state of being supported by the door from the lower side. Therefore, the mounting unit 10 is held even when tension is not applied to the string member 20. Thereby, the load on the string member 20 and the windlass to which the string member 20 is connected is reduced. Further, the flight vehicle 100 and the mounting unit 10 may be rotatably connected to one or more shafts in the axial direction so that the mounting unit 10 can control the posture independently of the posture of the flight vehicle 100. In this case, by deflecting the string member 20, it becomes possible to have a margin for rotation.

As shown in FIGS. 12 to 16, the mounting unit 10 includes a mounted object holding mechanism 12 for holding the mounted object 11 so as not to fall unintentionally during the flight of the flight vehicle 100 to which the mounting unit 10 is connected. Further, the mounted object holding mechanism 12 has a function of separating the mounted object 11 at the delivery destination. For example, there is a method in which claws for supporting the bottom surface of the mounted object are provided on all four sides, and the claws are inclined downward or pulled outward at the time of separation, thereby eliminating the support of the mounted object 11 and separating the mounted object.

In addition, examples of the method of holding and separating the mounted object by the mounting unit 10 are listed and described, but the following examples are not intended to limit the method. Any method capable of holding and separating the mounted object 11 can be used. Further, in the case where the mounting unit 10 is separated at each destination, the mounting unit 10 does not need to be provided with a separation mechanism. For example, the mounting unit 10 may have a configuration for releasing connection from the string member 20.

(1) Holding by magnetization or suction. For example, in the case of magnetization, a magnetic force generating device may be provided on the mounting unit 10 and a magnetizing object (for example, metal or the like) may be provided on the mounted object 11 to perform magnetization and release. In the case of suction, air suction or a suction cup or the like may be used to perform suction and release the mounting unit 10.

(2) Holding by pressure of fasteners, etc. For example, the mounting unit 10 may be provided with a fastener comprised of a band, a balloon, or the like, and may be held and separated by increasing and decreasing the pressure of the fastener.

(3) Holding by the door. For example, an openable door may be provided at the lower part of the mounting unit 10, and the door may be held and separated by opening and closing the door.

It is desirable to mount an object on the mounting unit 10 so that it can be inserted into at least one of the lower, upper, and side surfaces of the mounting unit. Further, when separating the mounted object at the destination, it is desirable that the mounted object be separated below the mounting unit. For example, when loading an object in a flight vehicle 100 with the mounting unit 10 retracted, it is possible to insert the object from the side, which makes it easier to insert the object into the mounting unit without having to look into the flight vehicle from a lower position or installing the flight vehicle at a higher location.

Figure 10:
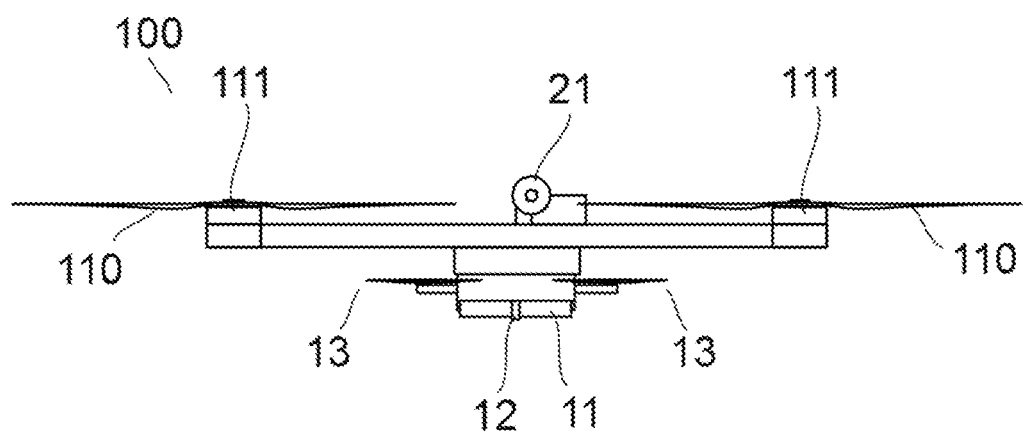
FIG. 10 is a side view when the flight vehicle according to the present disclosure holds a mounting unit.

The mounting unit 10 is provided with a moving means 13 that can move at least in the XY directions in the air. As shown in FIGS. 9 and 10, by providing a plurality of rotor blades, This prevents the mounting unit 10 from being swept away from the designated location by wind, etc., and improves the accuracy of the loading position of the mounted object 11. Further, the mounting unit controls its own position and stays within a predetermined range. Therefore, it is also possible to prevent degradation of the stability of the flight vehicle due to the large swinging of the mounting unit 10 suspended by the 20 string members.

Figure 19:
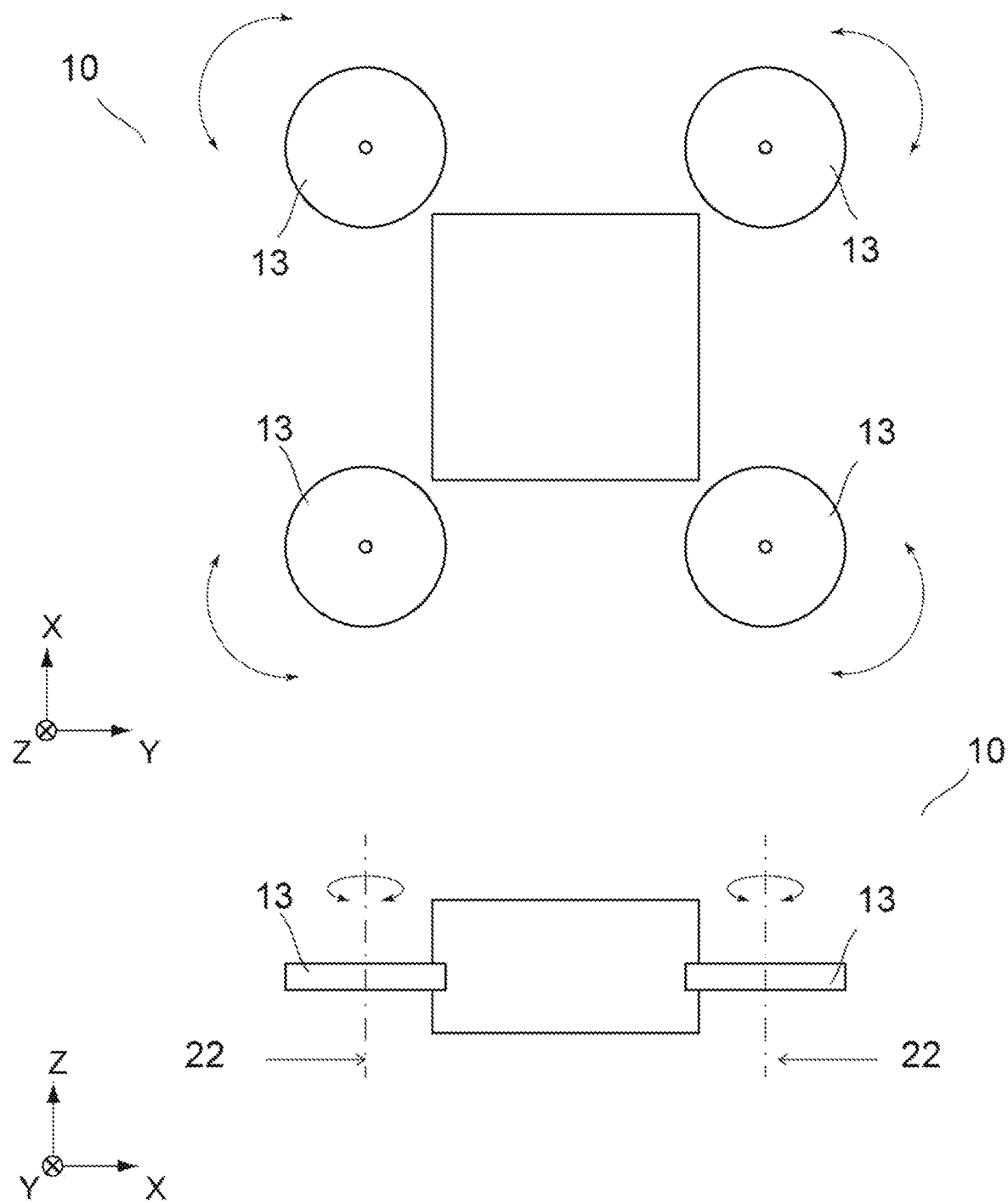
FIG. 19 is a schematic diagram showing a configuration example of a moving means of the mounting unit according to the present disclosure.
Figure 20:
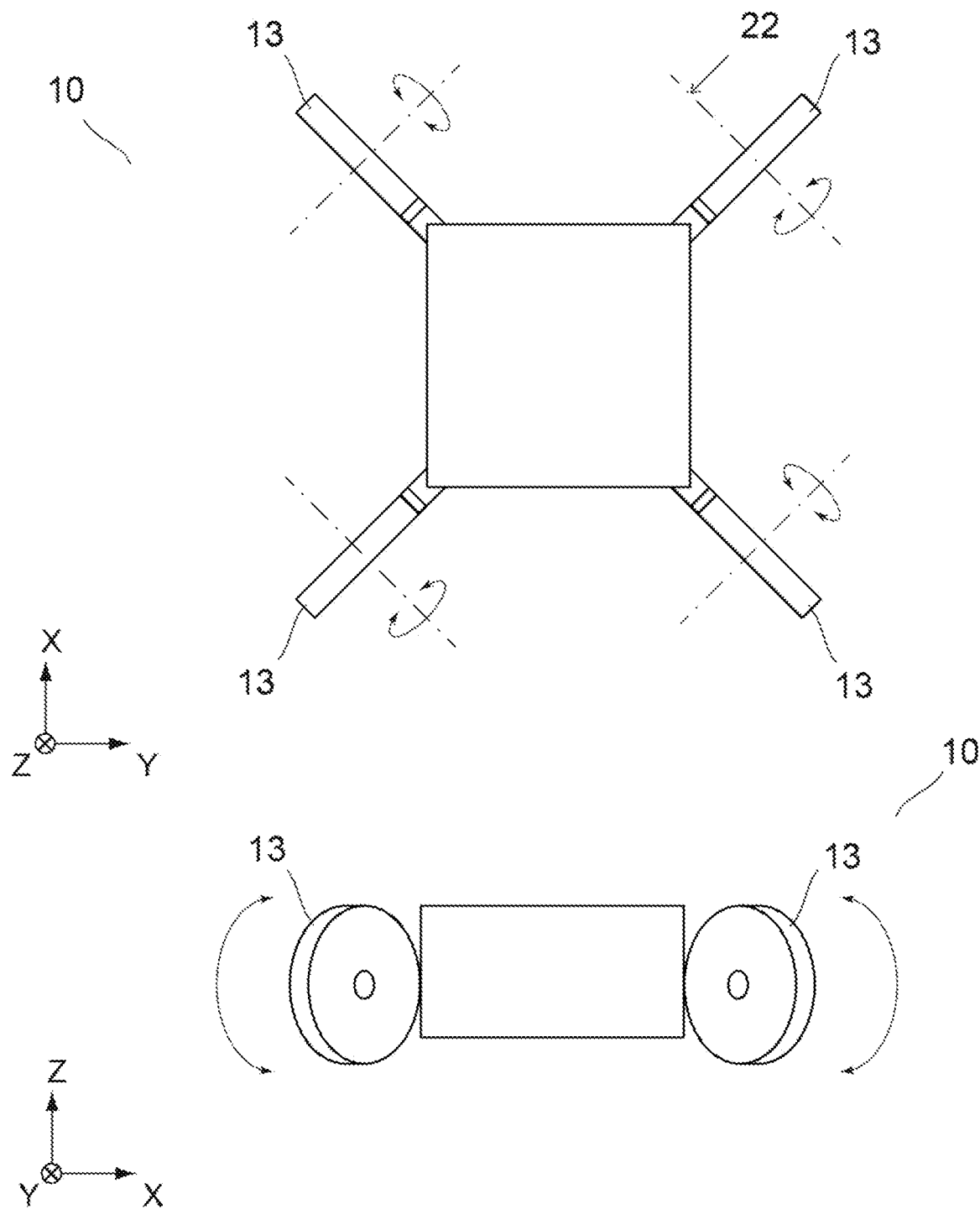
FIG. 20 is another schematic diagram showing a configuration example of a moving means of the mounting unit according to the present disclosure.

When the moving means 13 is a rotor blade, it is desirable that when the mounting unit 10 is viewed from the side, the connection position of the rotor blade is provided so that at least a part of the rotor blade is located between the upper end and the lower end of the mounted object. For example, when there are two rotor blades, the rotor blades are arranged so as to sandwich the mounted object when viewed from the upper. When there are three or more rotor blades, they are arranged so as to surround the mounted object by the rotor blades as shown in FIGS. 19 and 20. Rotor blades are provided within the upper and lower ends of the mounted object, so that the place pushed by the rotor blade becomes the vicinity of the center of gravity of the mounting unit 10, thereby being able to prevent fluctuation of the mounting unit 10 or the like. For example, if the rotor blade is installed above the upper end of the mounted object, a place upwardly away from the center of gravity of the mounting unit 10 is pushed, and there is a possibility that the fluctuation of the mounting unit 10 occurs. Preferably, the connection position of the rotor blade may be installed at a position that coincides with the center of gravity or substantially the center of gravity of the mounted object when viewed from the side.

Further, when the output of the moving means 13 included in the mounting unit 10 is made larger, it is possible to move it away from directly under the flight vehicle. In cases where there is a destination (a receiving port, etc.) on the side of a house, an apartment, or the like, the flight vehicle 100 needs to approach the building if the mounting unit 10 moves only directly under the flight vehicle 100. In addition to increasing the possibility of collision with obstacles as it approaches the structure, there is an increased possibility that a flight vehicle will enter an area where the airflow is turbulent due to updrafts or downdrafts, and the flight vehicle becomes unstable. Collisions and deterioration of the stability of the flight vehicle may lead to accidents such as breakdowns or crashes, and so it is desirable to avoid them. When the mounting unit 10 can be separated from directly under the flight vehicle, as shown in FIGS. 1 to 4, only the mounting unit 10 can approach the destination while the flight vehicle 100 is kept on standby at a place away from obstacles and areas where the air flow is turbulent.

Generally, it is known that a phenomenon such as hunting occurs when a rotorcraft of a fixed pitch enters an updraft. This phenomenon makes the flight vehicle unstable. However, in the mounting unit 10 according to the present disclosure, at least a part or all of the weight of the mounting unit 10 is supported by the flight vehicle 100, so that the same phenomenon does not occur. Further, since the mounting unit 10 is lighter than the flight vehicle 100, even if it comes into contact with a building or the like, the damage is reduced as compared with the case where the flight vehicle 100 comes into contact with it.

When the moving means included in the mounting unit 10 is a rotor blade, the rotary shaft 22 of the rotor blade may be extended in a direction containing a vertical component as shown in FIG. 19 and may be extended in a direction containing a horizontal component as shown in FIG. 20. When the rotary shaft 22 is extended in a direction containing a larger number of vertical components (that is, when the angle formed by the rotary shaft 22 and the Z axis in the vertical direction is smaller than the angle formed by the rotary shaft 22 and the X axis or the Y axis in the horizontal direction), the mounting unit 10 can support its own weight by the flight vehicle, and at the same time, it produces a force to raise its own weight. Therefore, the load applied to the flight vehicle 100 is reduced. On the other hand, when the rotary shaft 22 is extended in a direction containing a larger number of horizontal components (that is, the angle formed by the rotary shaft 22 with the horizontal X-axis or Y-axis is smaller than the angle formed between the rotary shaft 22 and the vertical Z-axis), the mounting unit produces almost no force to raise its own weight. Therefore, most of the force generated by the rotor blade forms a moving force (propulsive force), and the mounting unit 10 moves faster.

Regarding the detailed configuration of the rotor blade included in the mounting unit 10, the components overlapping with the rotor blade included in the above-mentioned flight vehicle 100 perform the same operation, and so a description thereof will be omitted again.

The rotary shaft 22 of the rotor blade included in the mounting unit 10 may be provided so as to be rotatable. For example, when the rotary shaft 22 is stored in the flight vehicle 100 and when the mounting unit is lowered in a normal mode, the rotary shaft 22 is set to a posture extending in the horizontal direction, and the force generated by the rotating blade is used for the movement in the XY direction. When an abnormality occurs in the flight vehicle 100 and the mounting unit is separated from the flight vehicle, the rotary shaft 22 is set to a posture extending in a direction including a vertical component, and the force generated by the rotor blade can be used for flying the mounting unit 10.

Further, when the rotary shaft 22 of the rotor blade provided in the mounting unit 10 is extended in the horizontal direction, at the time of propulsion of the flight vehicle 100, a rotor blade provided in the mounting unit 10 may be used as a part of the thrust of the flight vehicle. Thereby, the rotor blades and the motor included in the mounting unit 10 do not become a dead weight, and the rise of the travel speed of the flight vehicle can be expected.

A variable pitch propeller may be used for the rotor blade included in the mounting part 10. Compared to a fixed pitch propeller, which controls its position by controlling the number of rotations of a motor or other device, the position control by changing the pitch of the propeller has a higher response performance, allowing more precise position adjustment.

Figure 23:
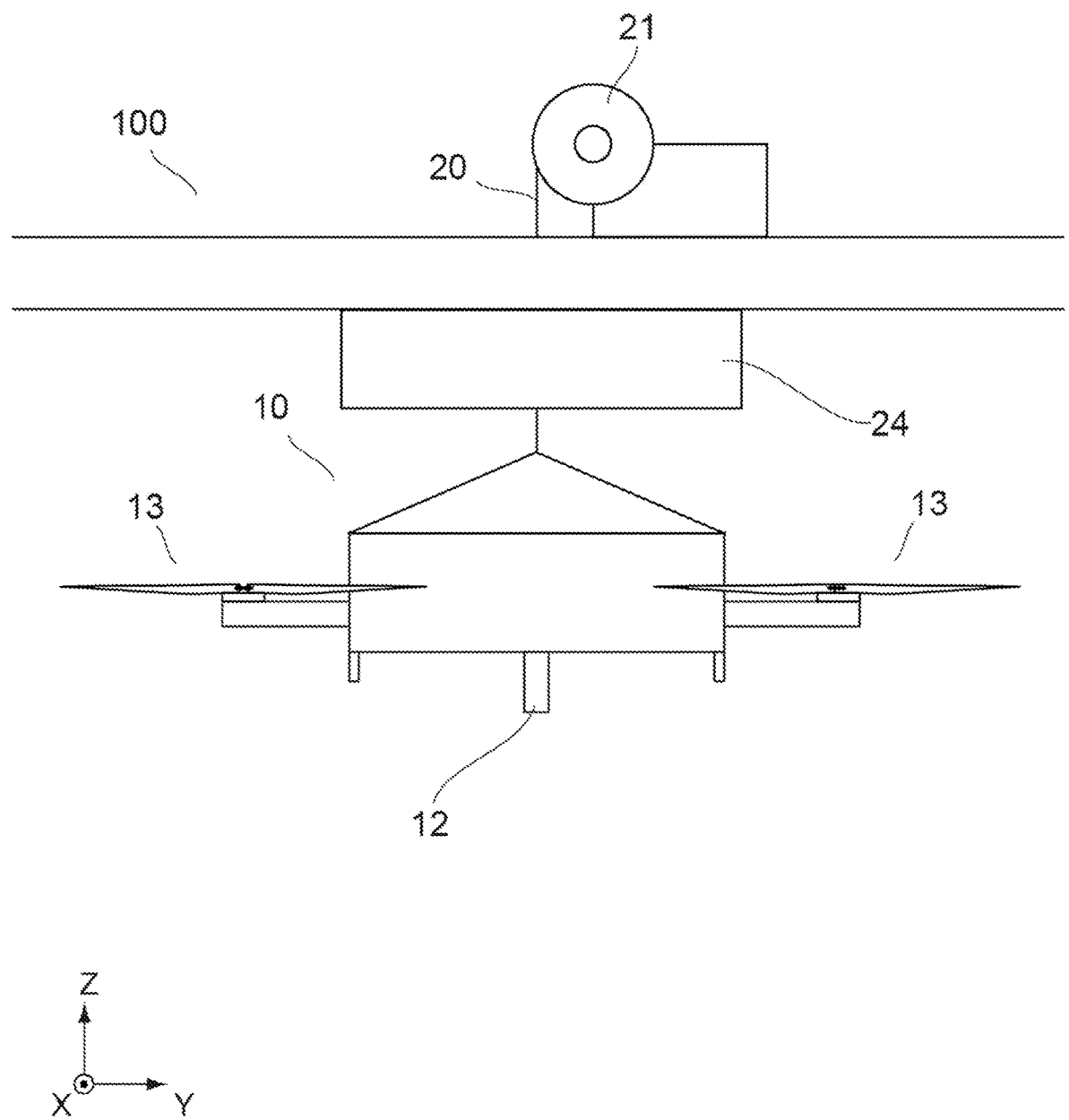
FIG. 23 is a view showing the angle correction part provided in the flight vehicle according to the present disclosure as viewed from the side.
Figure 24:
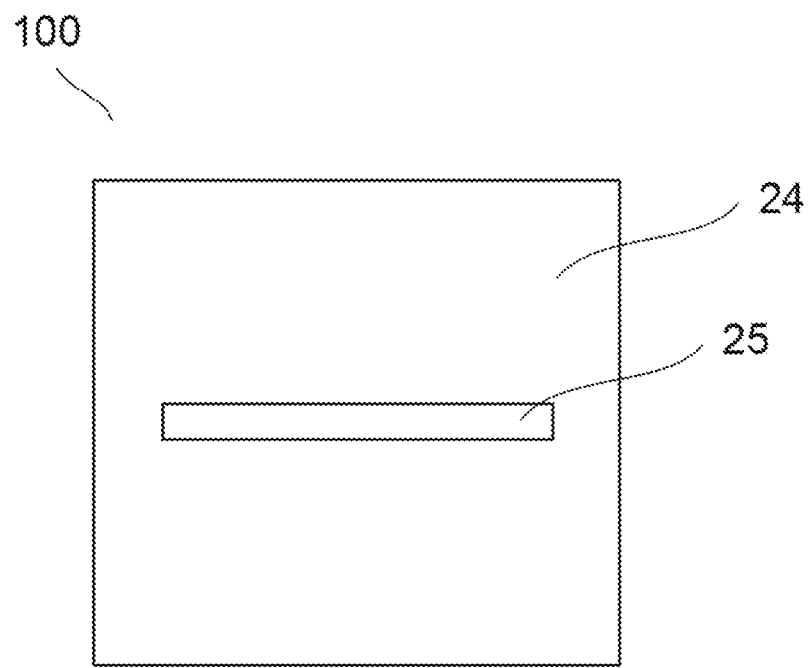
FIG. 24 is a view of the angle correction unit provided in the flight vehicle according to the present disclosure as viewed from the bottom.
Figure 24:
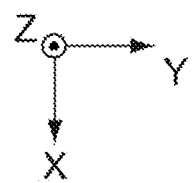
Figure 25:
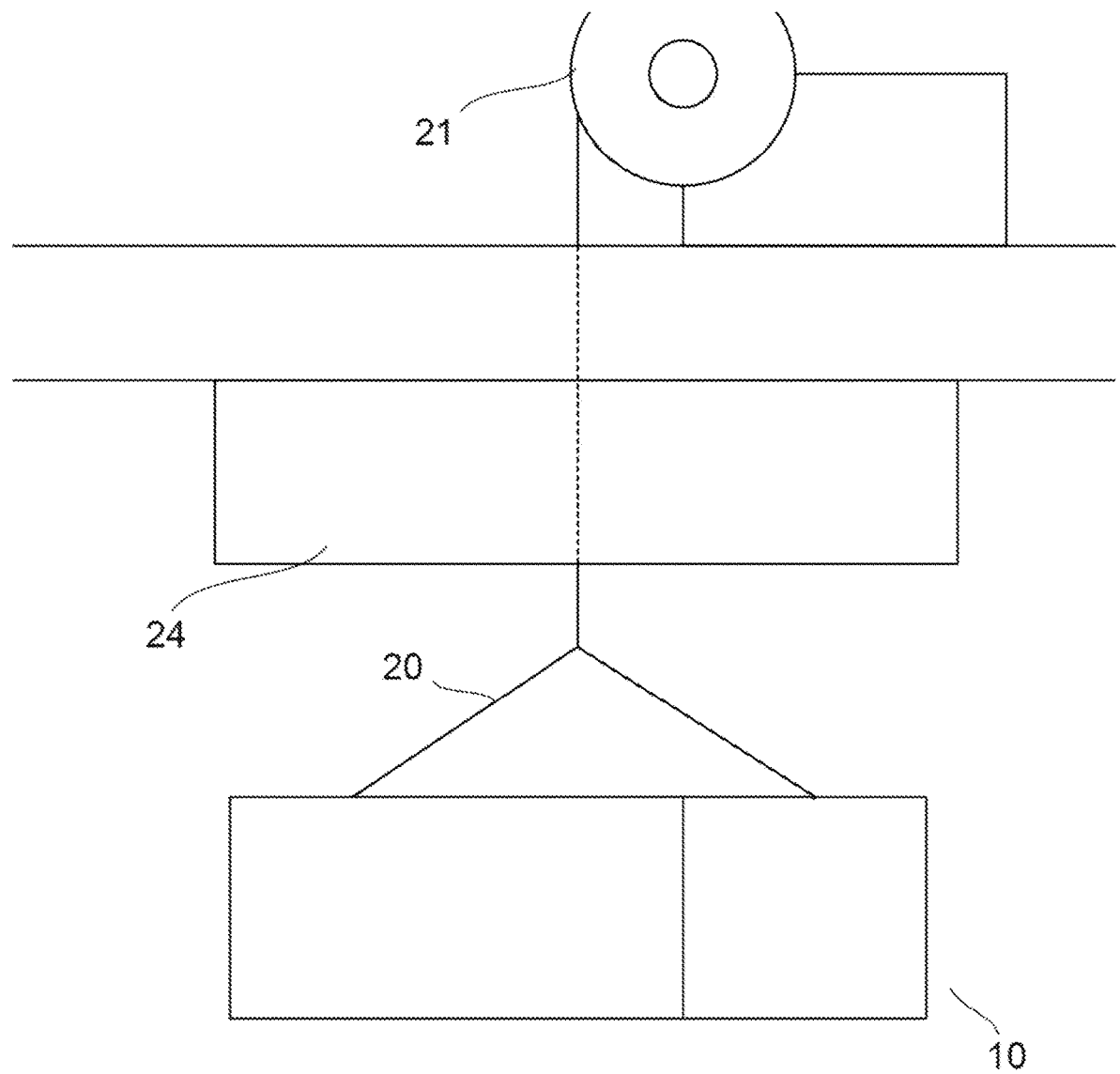
FIG. 25 is a side view before the angle of the mounting unit according to the present disclosure is corrected.
Figure 26:
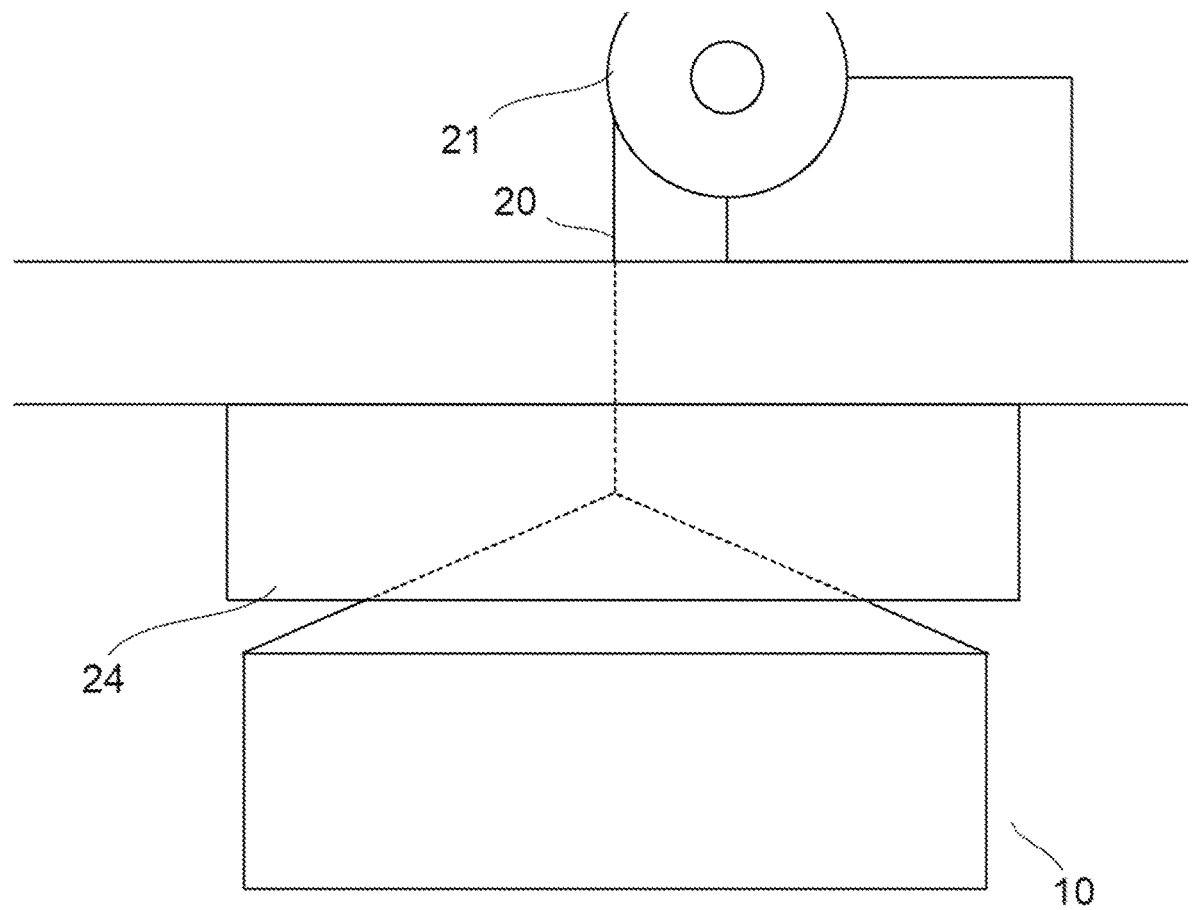
FIG. 26 is a side view when the angle of the mounting unit of FIG. 22 has been corrected.
Figure 27:
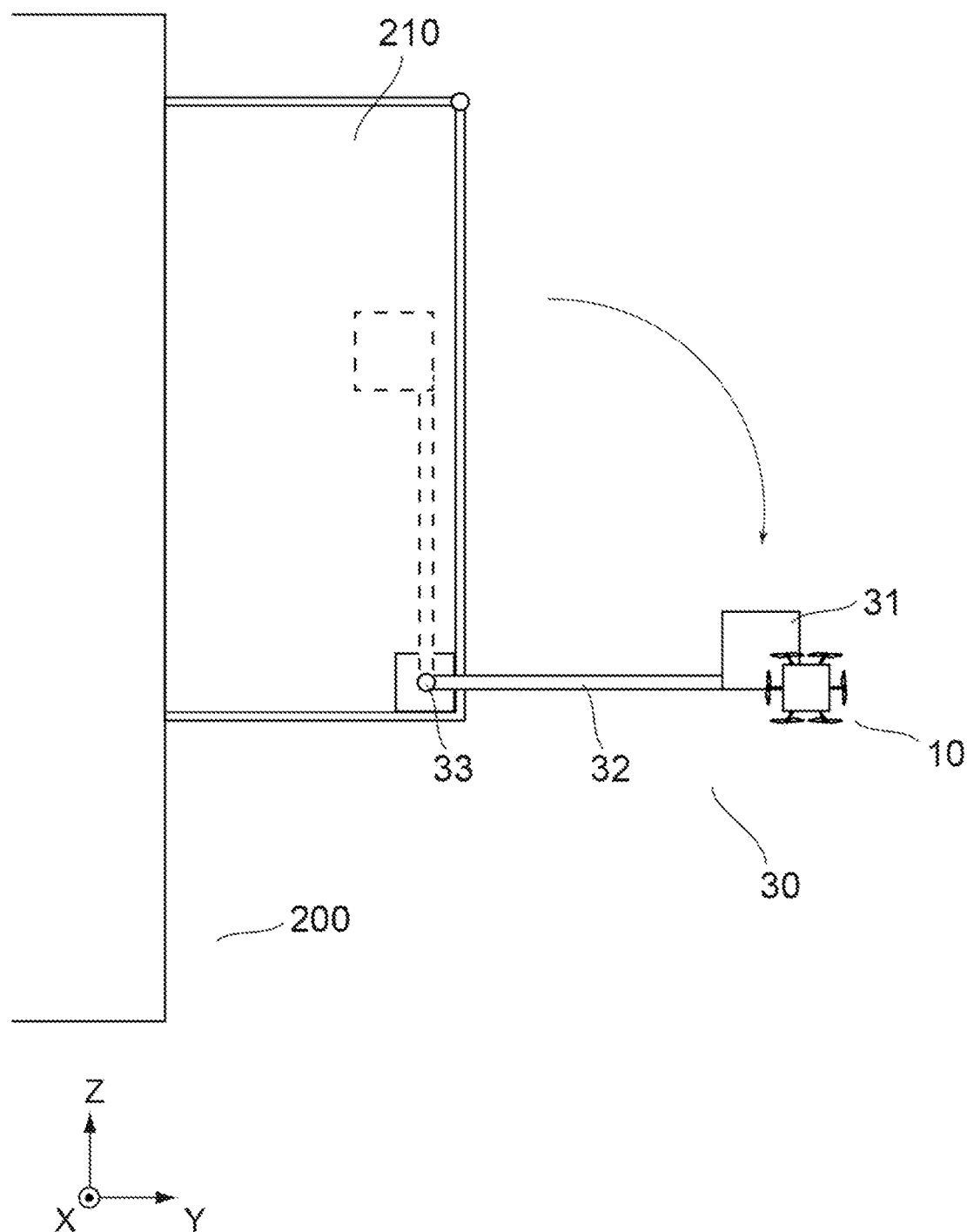
FIG. 27 is a top view of a configuration example of a delivery system according to the present disclosure.

From the viewpoint of weight reduction, it is desirable that there is one string member 20 connecting the mounting unit 10 and the flight vehicle 100. However, when the mounting unit is hanged at one point, the mounting unit may be inclined due to the unbalanced center of gravity of the mounted object or the collapse of the mounted object. In order to reduce the inclination of the mounting unit, it is desirable to branch the string member into two or more from a predetermined position and hang the mounting unit at two or more points as shown in FIG. 23. Further, in the case of hanging at three or more points, the inclination of the mounting unit is suppressed even if the mounted object has the unbalanced center of gravity, so that the baggage can be easily kept horizontal.

When connected by one string member (point), and when the mounting unit 10 ascends while rotating due to wind or vibration, it may approach the flight vehicle 100 in an unintended direction, may come into contact with the flight vehicle, or may not be able to enter the space to be stored. In the case where the string member is branched into two or more (points), if the mounting unit 10, which has descended once, is ascended to the vicinity of the flight vehicle again, the direction correction for setting the mounting unit 10 to an appropriate direction becomes easy.

As an example of the method of correcting the orientation of the mounting unit 10, there is a method of using the angle adjusting unit 24 as shown in FIGS. 23-26. By providing a slit 25 on the bottom surface of the angle adjusting unit 24 provided on the flight vehicle 100, when the string member 20 branched into two is pulled into a slit 25, the branched string member 20 enters the slit 25 at an angle close to a right angle in the top view. In this case, the slit 25 suppresses the force of the string member 20 trying to spread due to tension. As it is pulled deeper, the force that the string member 20 tries to spread becomes stronger, and it rotates so as to be parallel to the slit 25. Thereby, the mounting unit 10 facing an unintended direction can be adjusted to a predetermined direction. The strength and speed of the adjustment are adjusted by the width of the slit and the attachment angle of the two branched string members 20 and the like. Further, if the string member 20 is split into three or more branches, the shape of the slit 25 may be a shape that matches the shape of the branched string member 20 as viewed from above.

As a method of correcting the orientation of the mounting unit 10, additionally, there may be mentioned a method of controlling the self-position using the moving means 13 while the mounting unit 10 is being wound, a method of monitoring the orientation of the mounting unit 10 approaching the flight vehicle 100 and adjusting the orientation (yaw direction) of the flight vehicle, a method using a guide member that promotes a position adjustment by contacting the frame or the arm included in the mounting unit 10, and the like, without being limited thereto.

Figure 11:
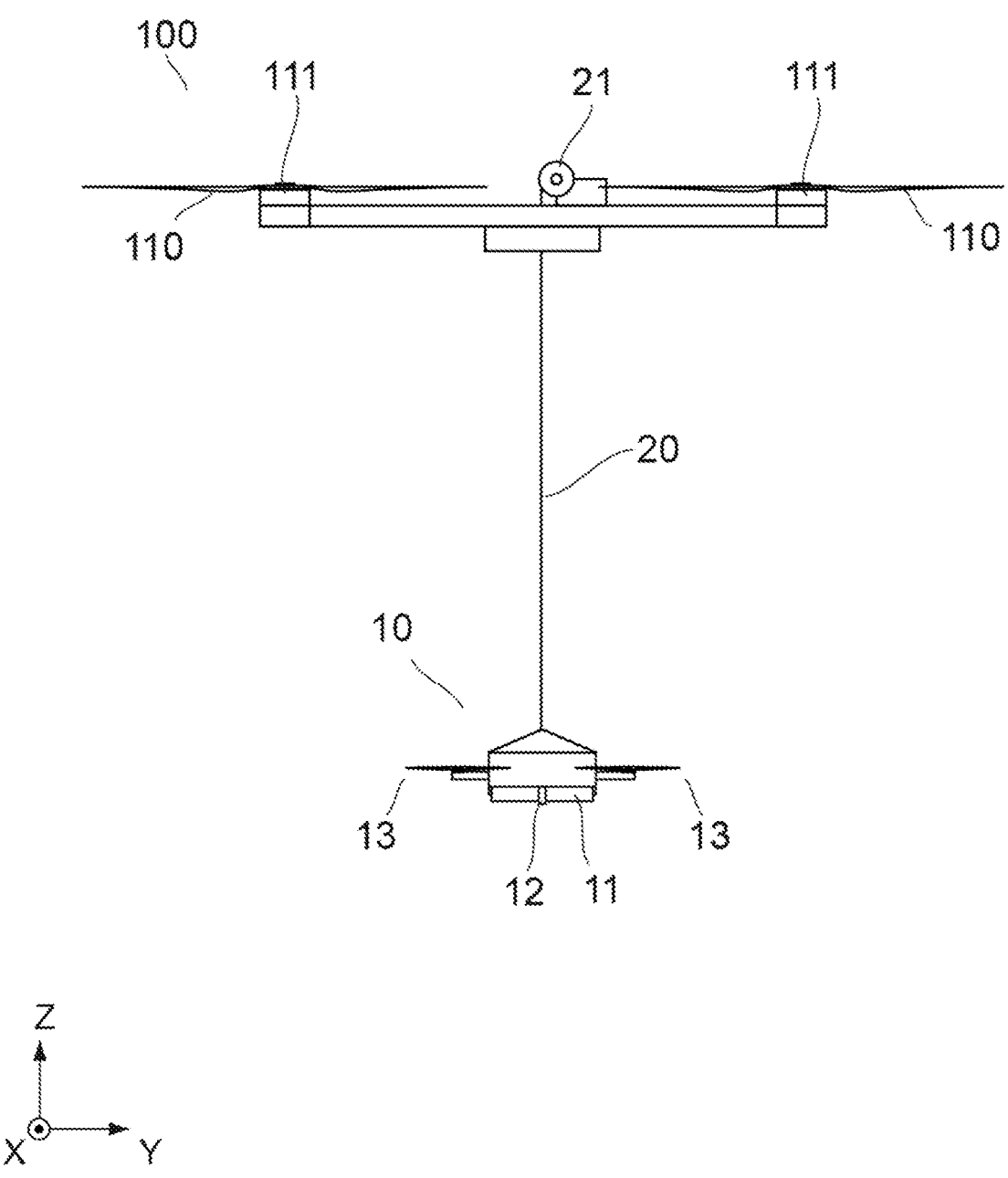
FIG. 11 is a view when the flight vehicle of FIG. 10 lowers the mounting unit.
Figure 12:
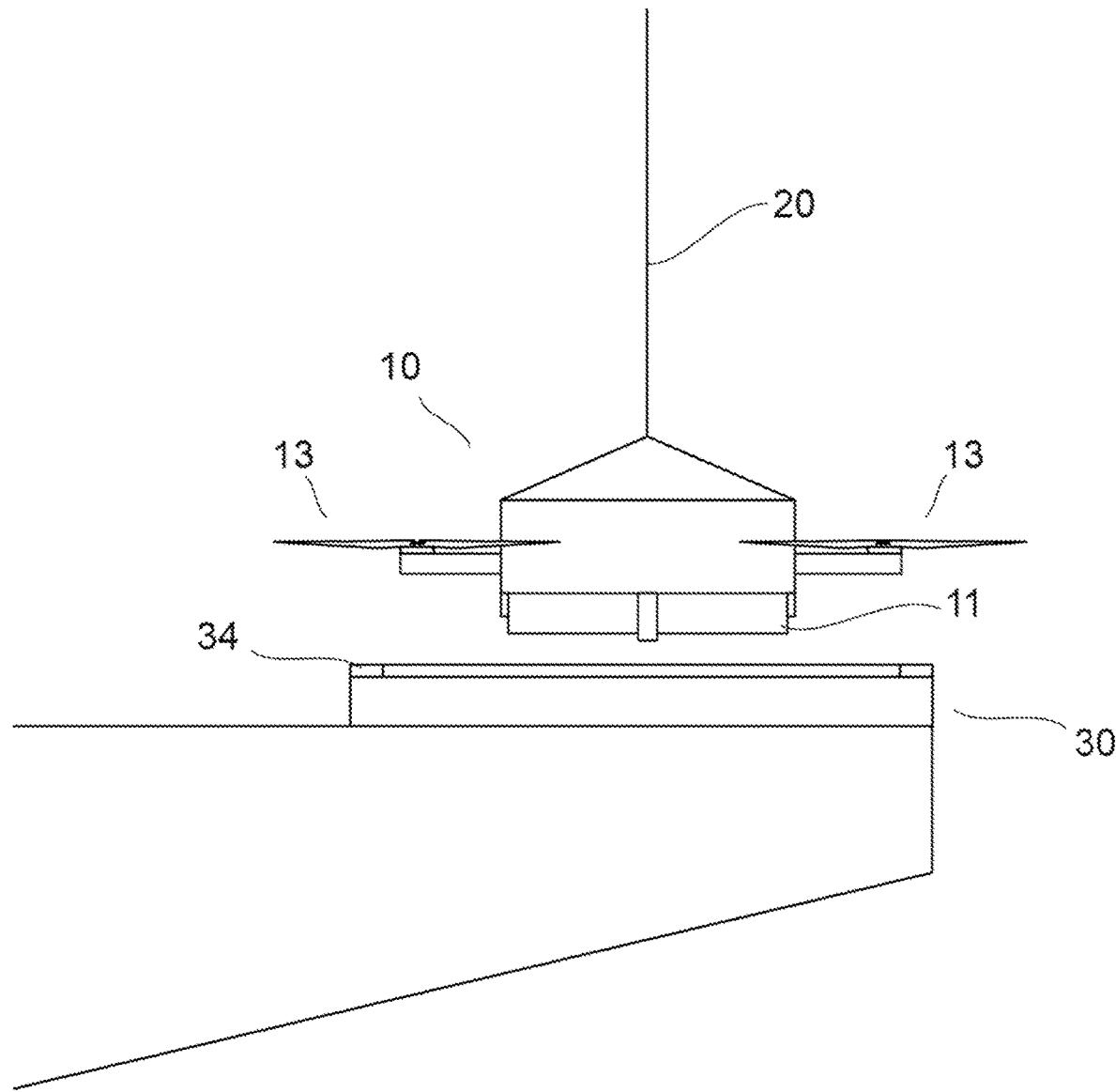
FIG. 12 is an enlarged side view of the mounting unit of FIG. 10 that has reached the vicinity of a port.
Figure 13:
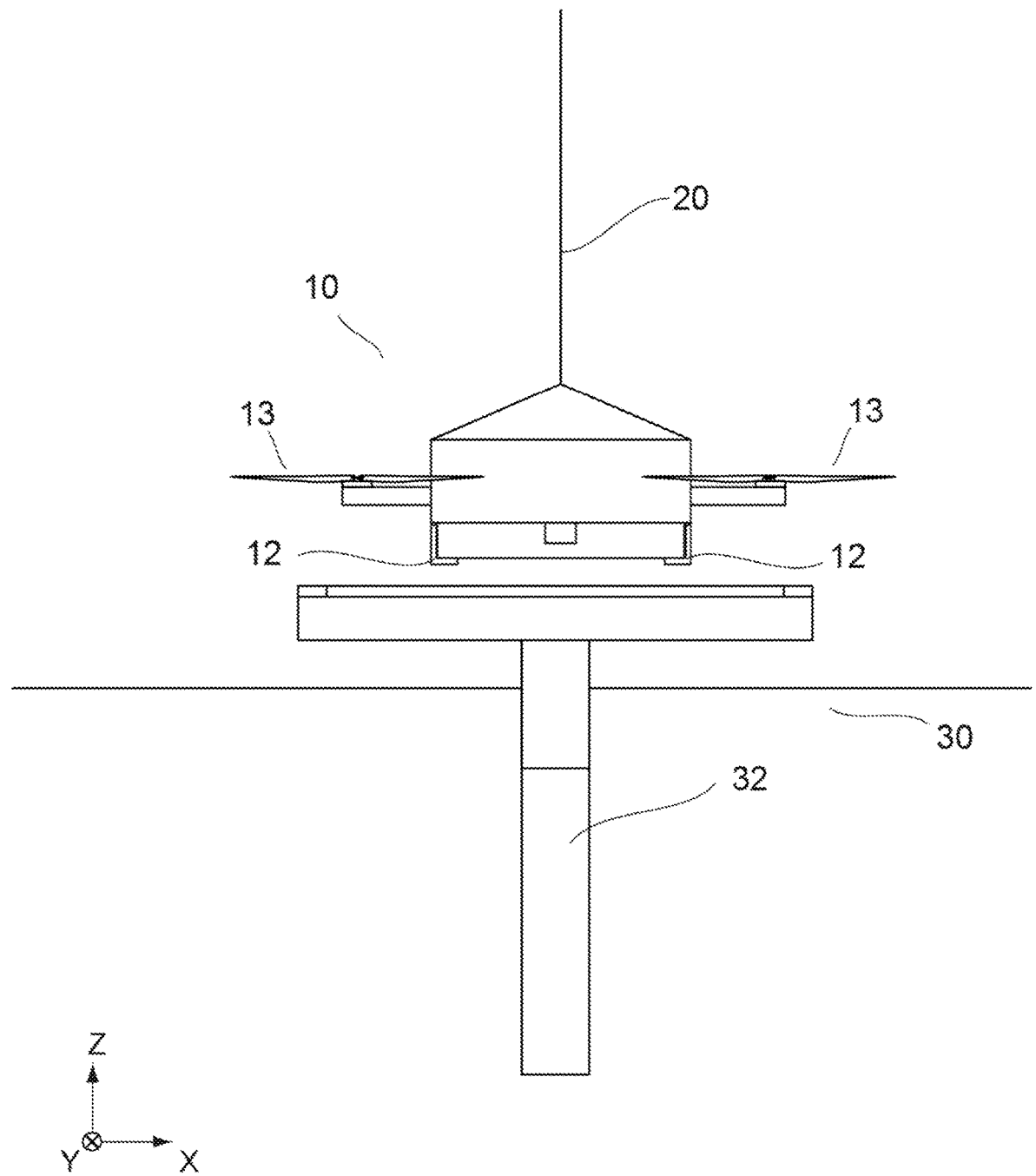
FIG. 13 is a front view of the mounting unit of FIG. 12.
Figure 14:
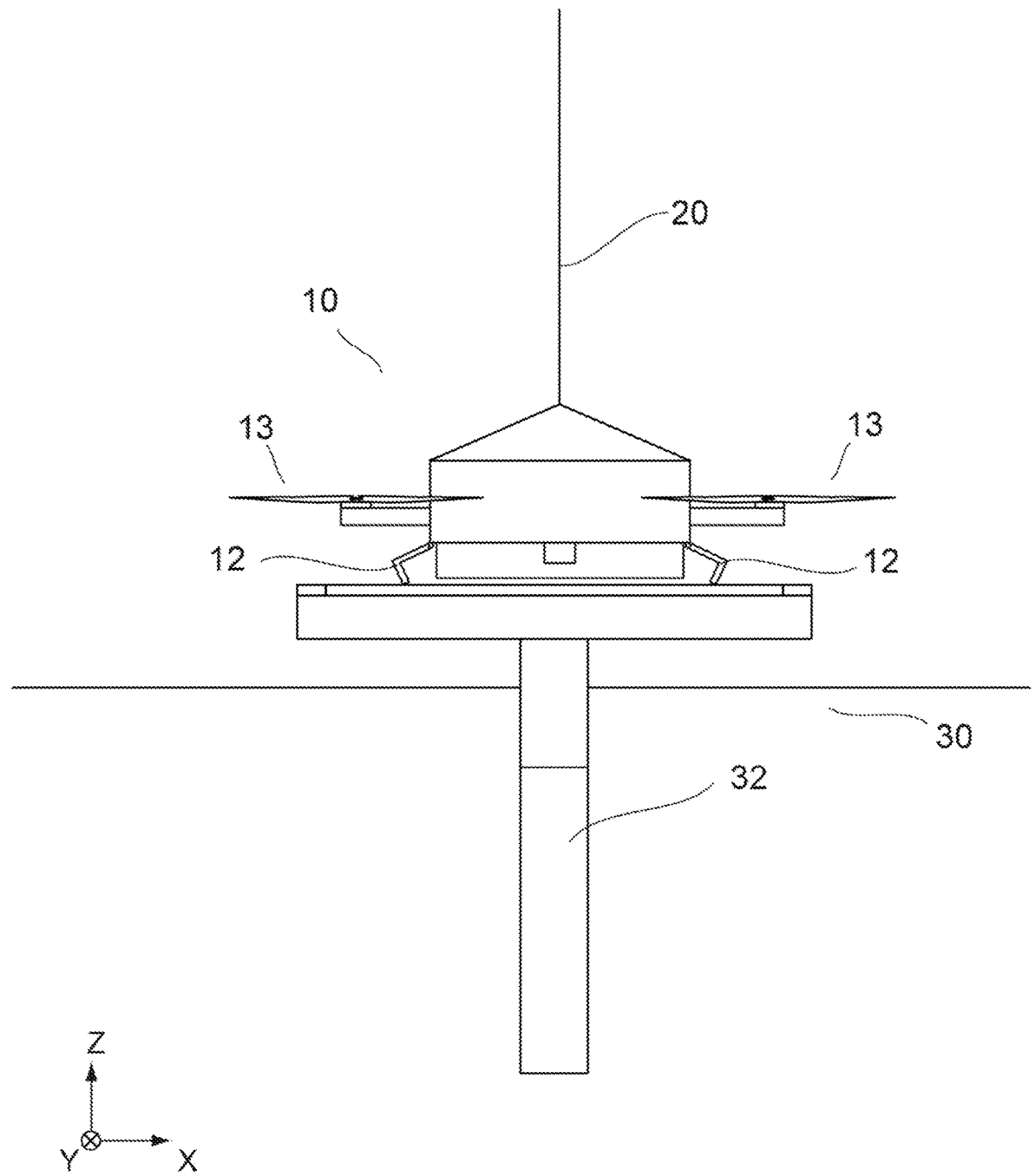
FIG. 14 is a view when the mounting unit of FIG. 13 preforms unloading.
Figure 15:
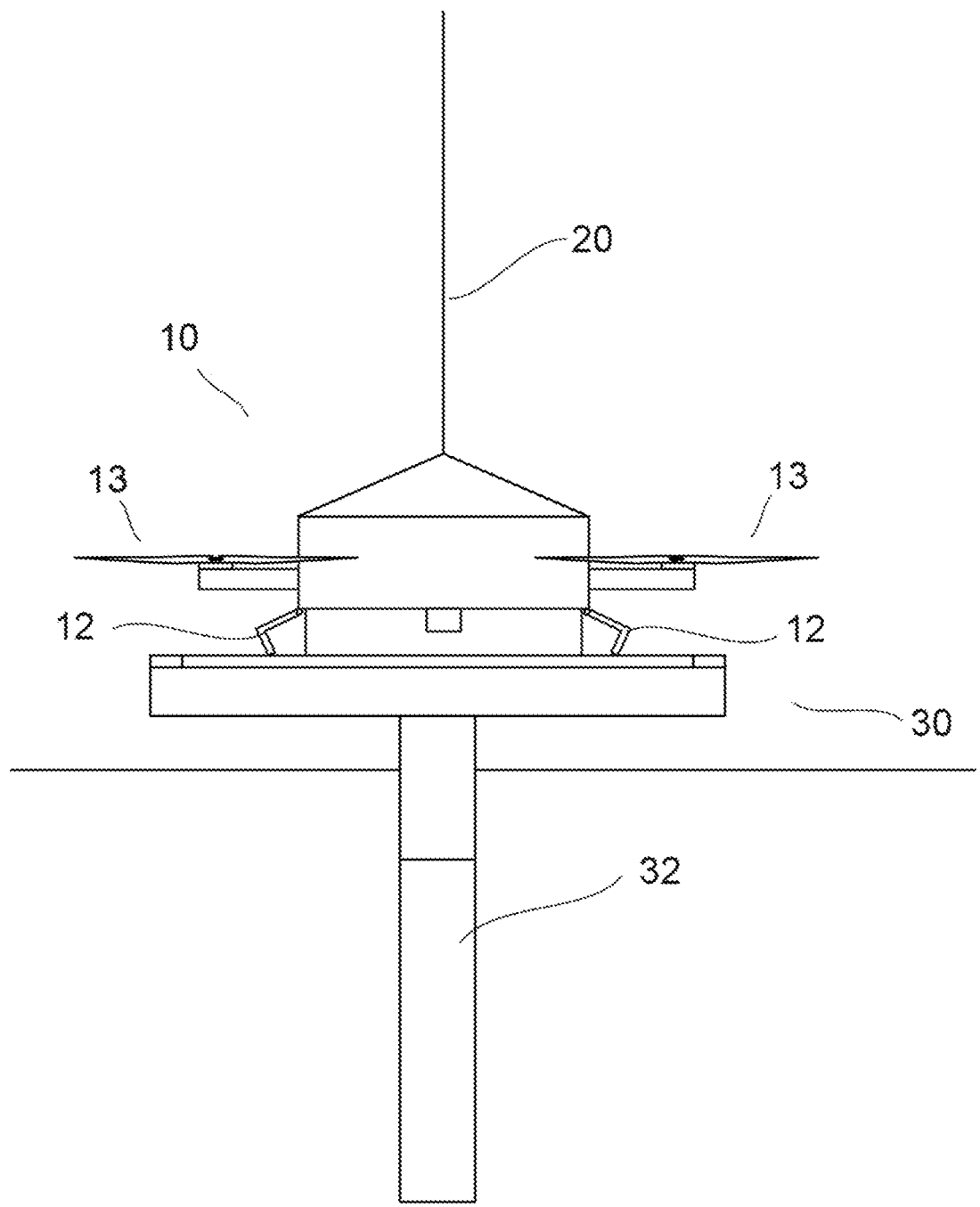
FIG. 15 is a view when the mounting unit of FIG. 13 performs unloading.
Figure 16:
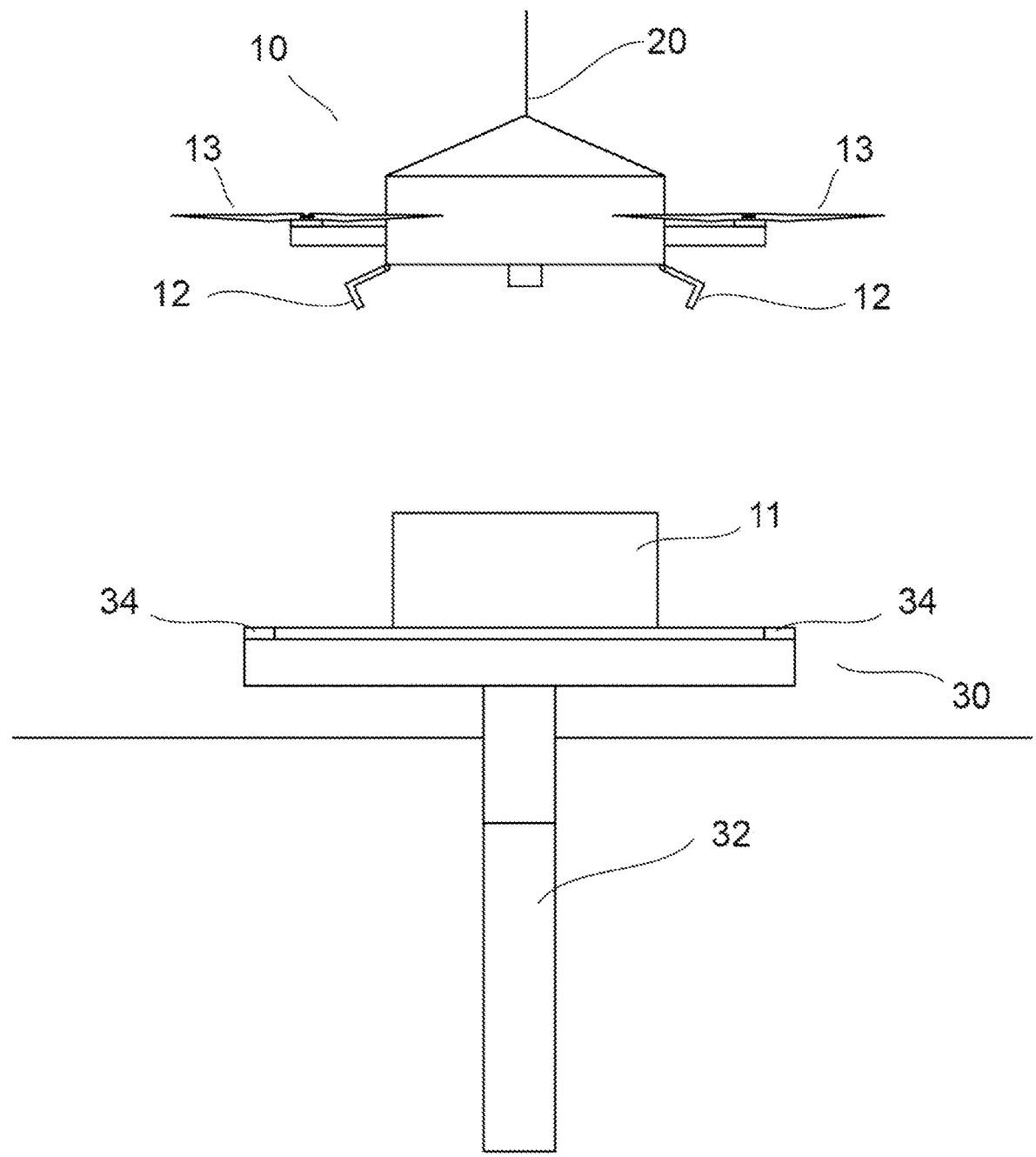
FIG. 16 is a view after the mounting unit of FIG. 13 has completed unloading.

As shown in FIGS. 10 and 11, one end of the string member 20 is connected to a mechanism (hereinafter, collectively referred to as a hanging mechanism 21) such as a winch, a reel, or a hoist capable of feeding and unwinding the string member 20. The other end is connected to the mounting unit 10.

The hanging mechanism 21 operates using a motor, an engine, a compressed air, or the like. These power sources may be the same energy (e.g., secondary battery, fuel cell, fossil fuel, etc.) used for the flight of the flight vehicle 100 or may be separately provided for the operation of the winch. Further, the vertical control of the mounting unit by the winch is performed by at least one of the flight vehicle 100, the mounting unit 10, and the port.

The mounting position of the hanging mechanism 21 in the flight vehicle 100 is generally installed above the mounting unit 10 (e.g., FIG. 5). However, in the case of the flight vehicle 100 (e.g., a flight vehicle used for home delivery service) having a long time travelling in one direction when cruising, the hanging mechanism 21 is provided above the flight vehicle 100, the total height of the main body of the flight vehicle 100 and the air resistance during cruising. Therefore, as shown in FIGS. 21 and 22, it is more desirable to mount the hanging mechanism 21 in a position that is less likely to increase aerodynamic drag during flight and that is at least offset in the front-back direction (Y-direction) from the center of gravity of the flight vehicle 100 or directly above the string member 20 extending from the mounting unit 10. The mounting position of the hanging mechanism 21 is determined to be an appropriate position in consideration of the magnitude of aerodynamics and drag from the cruising posture and cover shape of the flight vehicle 100 to be mounted.

Further, the string member 20 extending from the hanging mechanism 21 is connected to the mounting unit 10 without coming into contact with the constituent members of the flight vehicle 100 by being hung on one or more pulleys 23. In particular, in a configuration in which the hanging mechanism 21 is provided below the connection position between the mounting unit 10 and the string member 20, the string member 20 is prevented from coming into contact with the mounting unit 10 by using two or more pulleys 23.

The hanging mechanism 21 used by the flight vehicle according to the present disclosure may be further provided in the mounting unit 10 in addition to the flight vehicle 100. By connecting the mounting unit 10 and the mounted object 11 with a string member and performing ascending and descending, precise ascending and descending control becomes possible even when the distance between the flight vehicle 100 and the mounting unit 10 is far apart.

As a port that is one of the destinations of the mounting unit 10, a pad or a port provided on the ground or a roof, a port installed on a window or a balcony of a building, or the like is known as a well-known technique. At houses and facilities with gardens, it is easy to install a port on the premises. A well-known port can be used even in the delivery system according to the present disclosure. However, when delivering to a house that does not have a privately owned garden (for example, a room in an apartment on the second floor or higher above the ground, an office in a building, etc.), individual delivery using windows or balconies is desired.

As shown in FIG. 1 to FIG. 4, the port 30 according to the present disclosure comprises a baggage receiving part 31 where baggage is placed, or is connected to be received, and a rotating unit 33 that rotates the baggage receiving part 31 independently of the building 200. The port 30 is preferably installed at a position that is easy to access from the sky outside the building, such as a balcony, a veranda, a window, an outer wall, etc., of the building 200. The port 30 may be movable, but it is desirable that the port 30 is fixedly installed to the building 200 in order to reduce the possibility of tipping over and improve the reliability. Further, when the distance between the baggage receiving part 31 and the rotating unit 33 is increased, a support unit 32 that connects to and supports the baggage receiving part and the rotating unit may be provided.

As shown in FIG. 2 and FIGS. 27-29, the port 30 comprises at least a standby mode in which does not accept baggage and a baggage receiving mode in which accepts baggage from a flight vehicle or the like. In the standby mode, the baggage receiving part 31 is in a state of approaching the building 200. Desirably, it is a position where a person in the building can easily unload the baggage placed in the baggage receiving part and is not easily affected by the wind. In the baggage receiving mode, the rotation of the rotating unit 33 causes the baggage receiving part 31 or the support part 32 to rotate in a substantially horizontal direction, and the baggage receiving part moves to a position farther from the building than in the standby mode.

The rotary shaft included in the rotating unit 33 extends in a direction containing at least the Z-axis component, and makes the baggage receiving part 31 or the support part 32 rotatable. The rotation may be performed manually using a hand-cranked handle or the like, or may be automatically performed using an electric motor, an engine, or the like. When it is automated, it rotates at a predetermined timing based on information such as the estimated time of arrival of the flight vehicle and the sign of approach, and receives the baggage.

Figure 28:
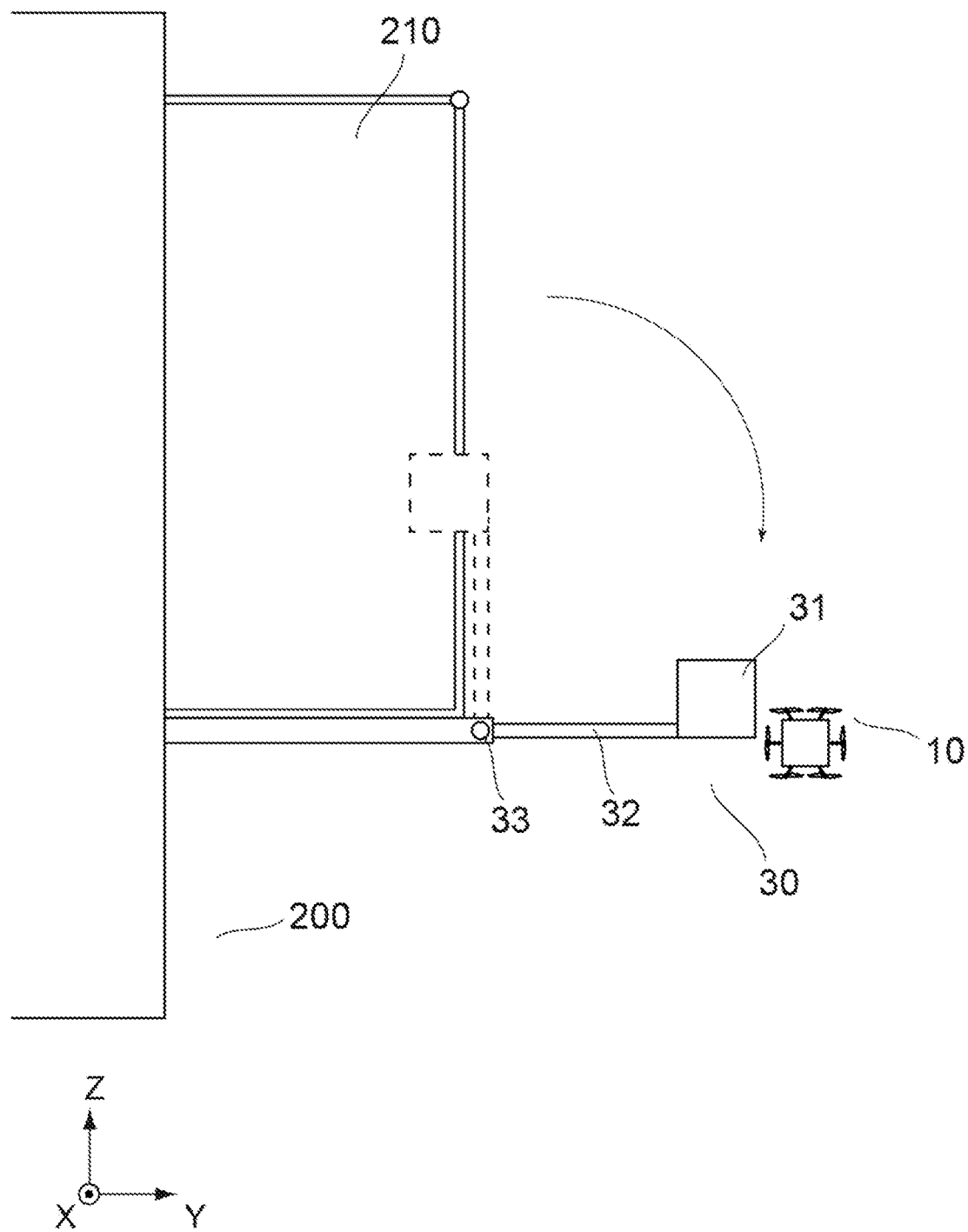
FIG. 28 is another top view of a configuration example of the delivery system according to the present disclosure.
Figure 29:
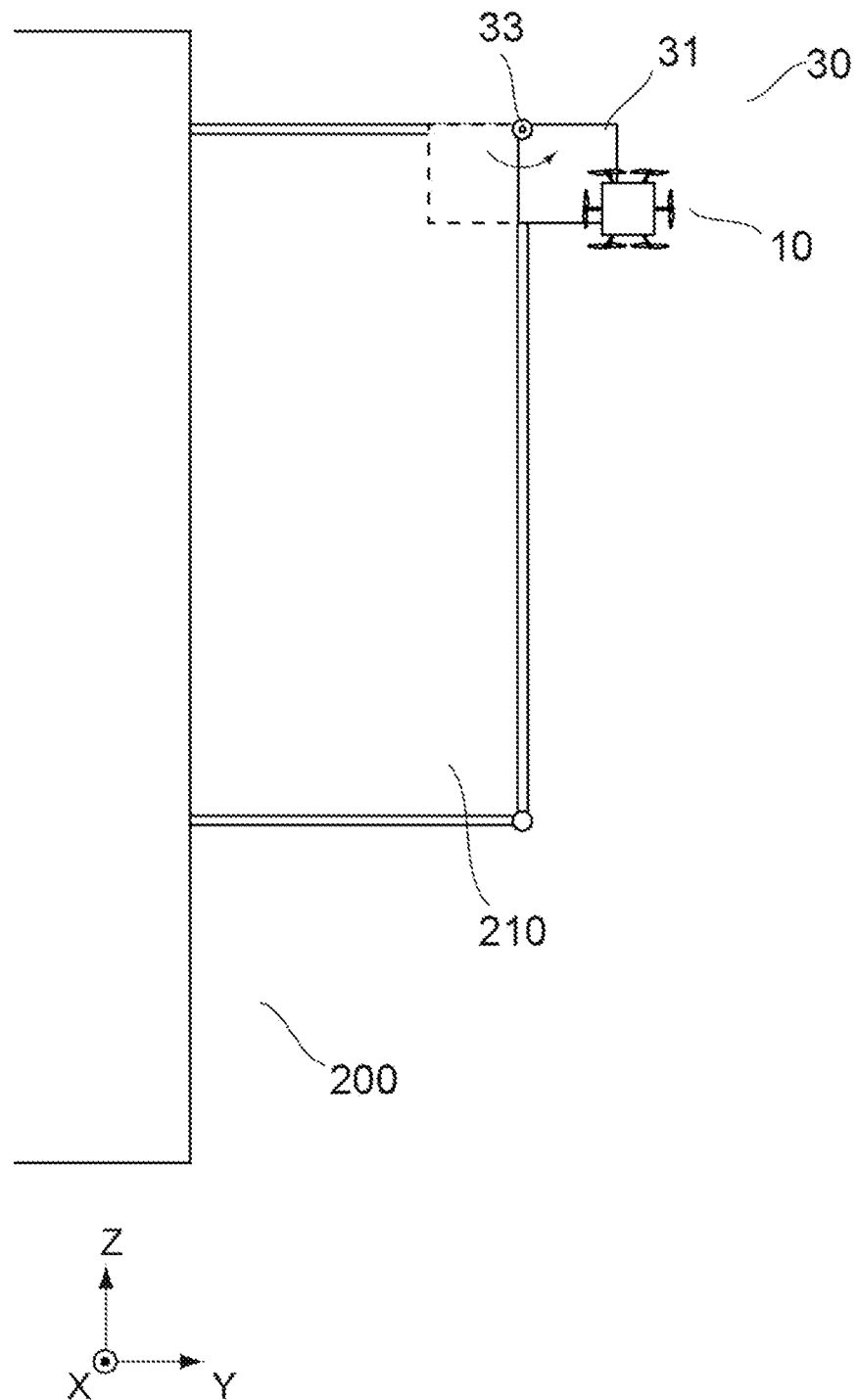
FIG. 29 is another top view of a configuration example of the delivery system according to the present disclosure.

In the vicinity of the wall surface of the building 200, the wind that collides with the wall surface produces an updraft or a downdraft on the front surface (collision surface), and produces a strong horizontal wind on the side surface. In the baggage receiving mode, it is desirable that the baggage receiving part 31 exists farther outward from the strong wind flow. However, when the baggage receiving part 31 is separated from the building 200, the support part 32 becomes longer. The optimum configuration is determined based on the strength of the support, the manufacturing cost, the area of the balcony and windows, and so on. For example, as shown in FIG. 28, it may be installed on a member with high strength such as a skeleton of a building 200.

The baggage receiving part 31 may have a flat surface shape on which a flight vehicle can land or place a baggage 11 or may be provided with an arm, a robot hand, or the like for receiving the baggage. Also, in the case of a system in which baggage is hung from a flight vehicle to a string member and descends, it may be equipped with a connection mechanism that grabs and connects the baggage 11 and the string, and may have a function to cut the string member above the connection mechanism. That way, it is not necessary to provide a baggage separation mechanism on the flight vehicle or the mounting unit, and the weight increase of the flight vehicle can be suppressed.

If the baggage receiving part 31 has a shape that allows the baggage to be placed, it is desirable to have a function to prevent the placed baggage from moving or falling due to wind or the like. The configuration examples of the baggage receiving part are listed below.

(1) Provide movable walls and fences around the baggage receiving part.

(2) Make a step or angle on the floor of the baggage receiving part.

(3) Suction by negative pressure.

(4) Temporarily fix using magnetization, adhesion, hook-and-loop fastener, etc.

(5) Provide permanent walls and fences around the baggage receiving part.

Figure 17:
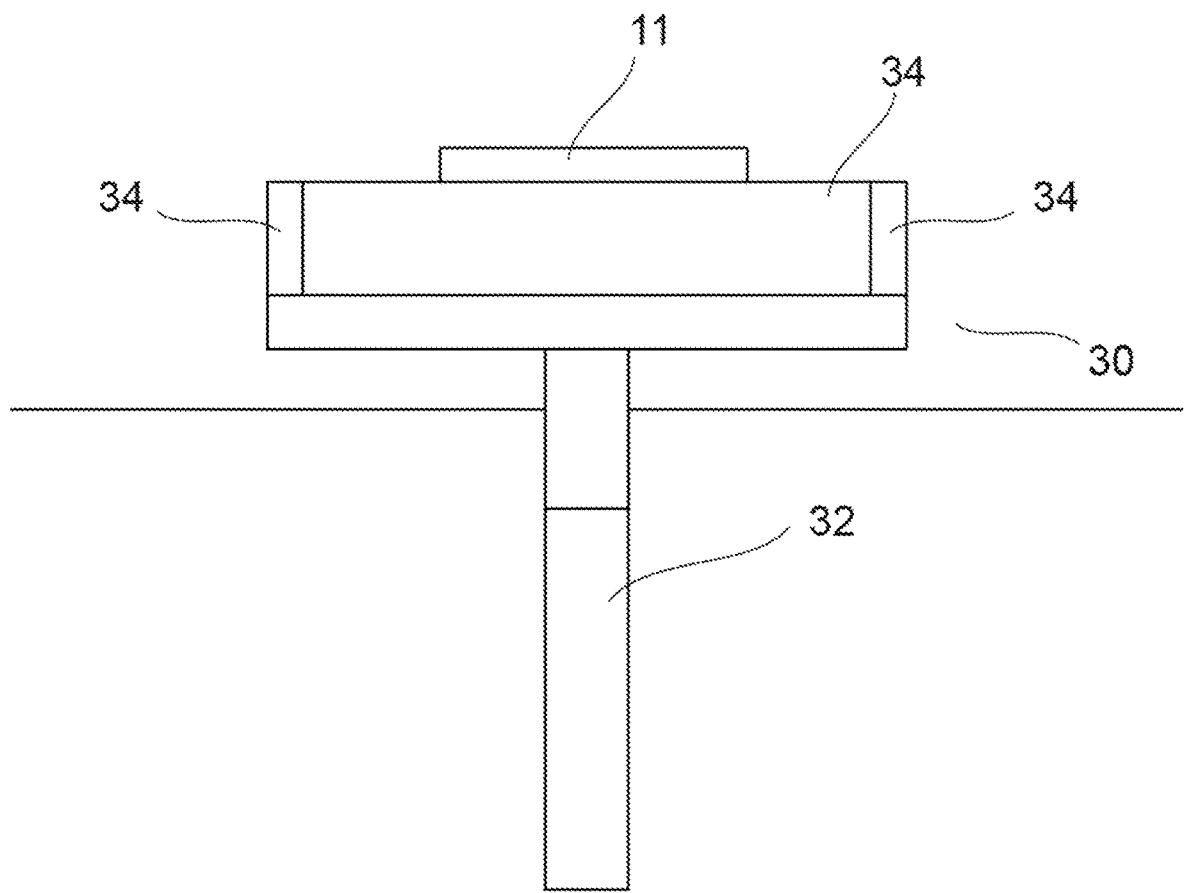
FIG. 17 is a view when the port of FIG. 13 has protruded the fall prevention member to the upper part.
Figure 18:
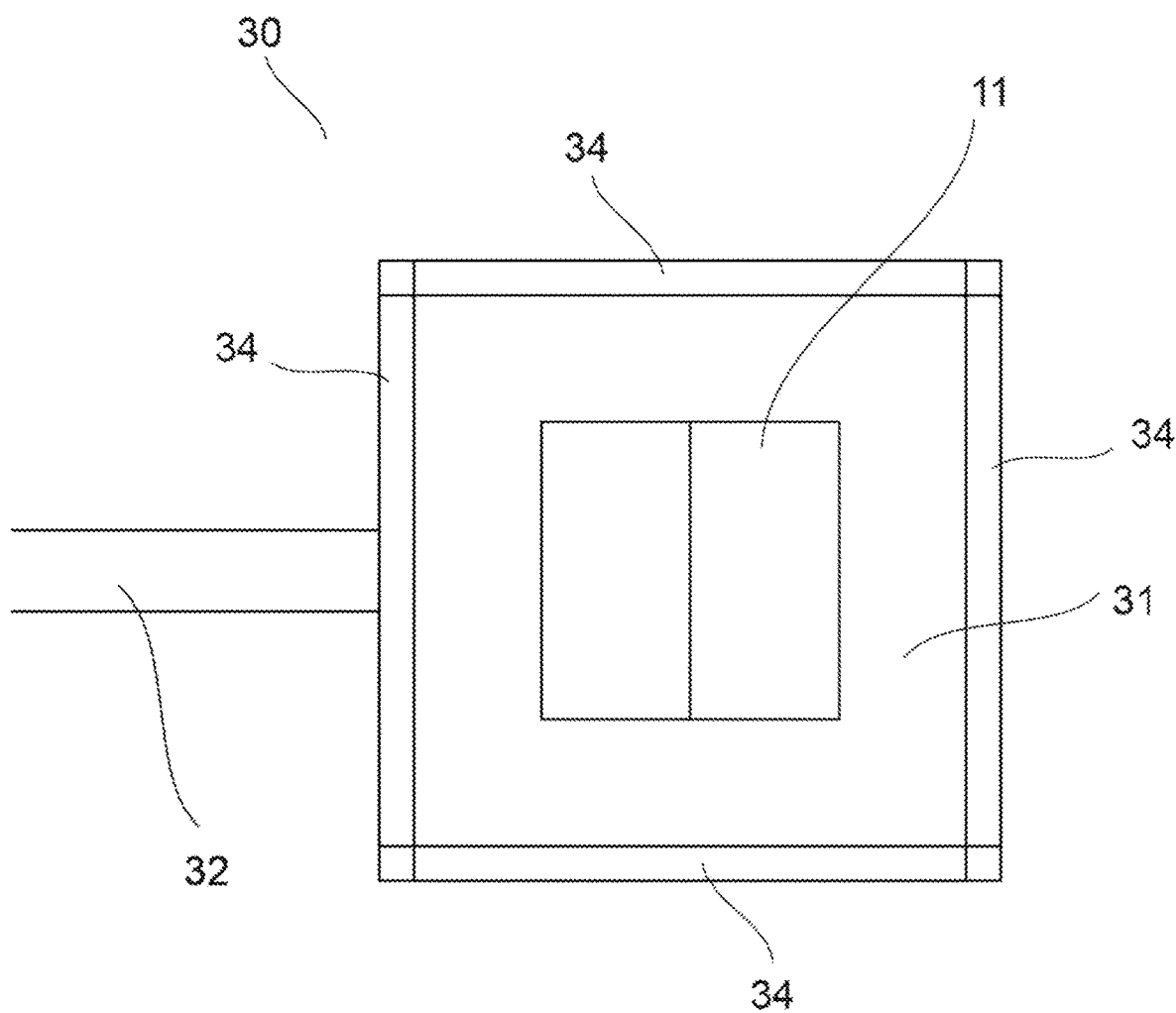
FIG. 18 is a view of the port of FIG. 17 as viewed from above.

When the fall prevention member 34 such as a fence or a wall is provided as shown in FIGS. 17 and 18, it may hinder the landing operation of the flight vehicle 100 and the operation of placing the baggage 11 if the fall prevention member 34 is always installed high. Thus, it is desirable to be able to adjust the length protruding above the surface plane by using a mechanism such as expansion/contraction and opening/closing. Further, in the case of a baggage that can be dropped over a short distance, it may be dropped into an enclosed space without driving a fall prevention member.

Figure 30:
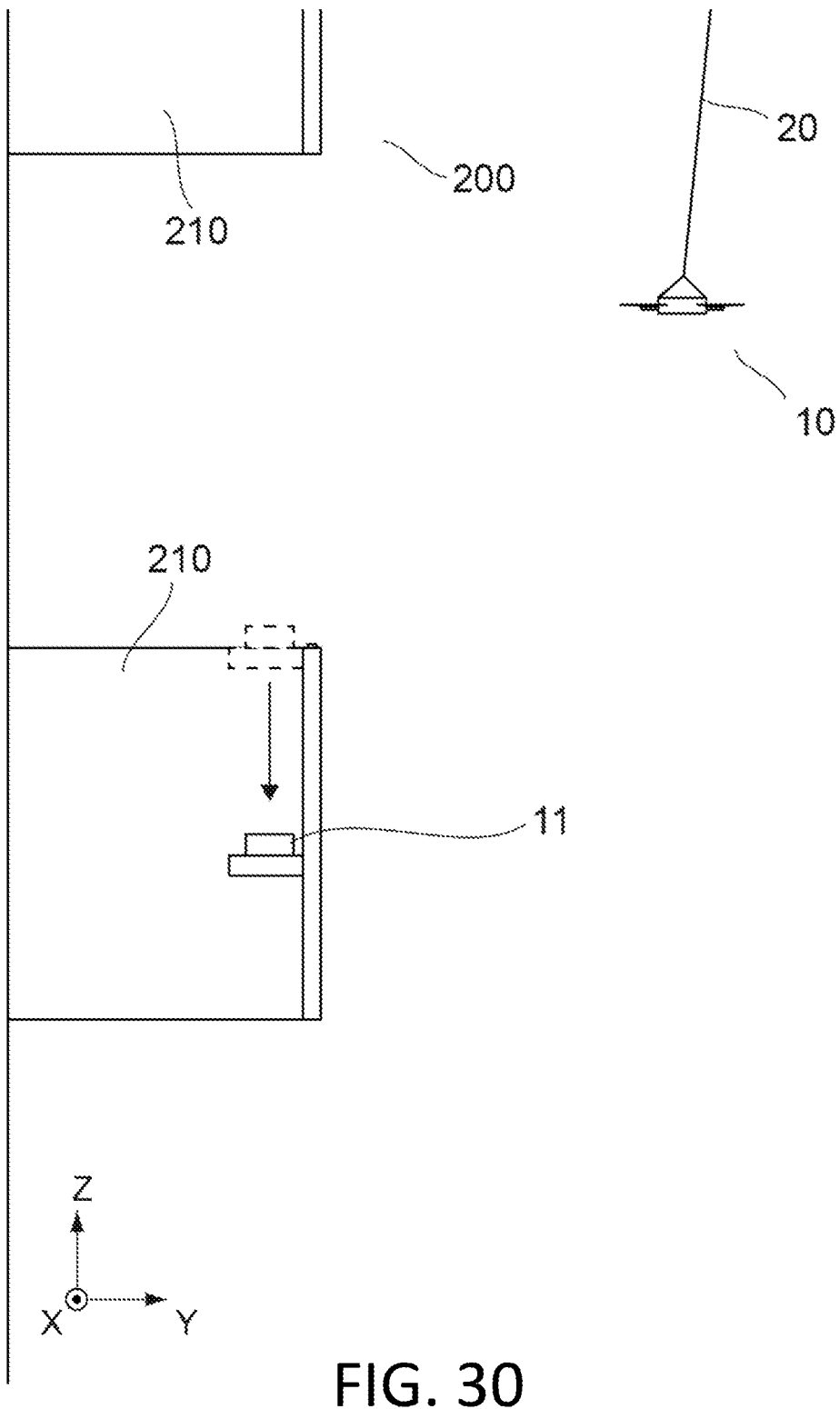
FIG. 30 is a side view of a configuration example of a delivery system according to the present disclosure.

As shown in FIG. 30, after receiving the baggage 11, the port 30 may have a pull-in function (e.g., elevator, conveyor, etc.) to place the baggage inside a balcony 210, in a place where people can easily receive the baggage, such as indoors, or in a place where the baggage can be safely stored. Thereby, this not only prevents the loss of the baggage received, but also makes it easier for people to access the baggage. Further, after the baggage 11 is pulled in, the baggage receiving part 31 is in a state where it can receive the baggage again, and the efficiency of receiving the baggage is improved.

The support part 32 has a strength that can withstand the weight applied by placing the baggage 11 or the like and the pressure applied by the wind. As for the material and shape, a suitable configuration is selected based on the weight of the baggage received and the conditions of the installation position. For example, when a plate-shaped member is used, it is possible to make a several hole in a member, make a passage space of air, and reduce the pressure received by wind.

In addition, when the pipes are combined (e.g., truss structure), the cross-sectional shape of the pipes may not be a perfect circle but an ellipse or a symmetrical wing shape to reduce the pressure received from the wind from a certain direction.

Details of the Second Embodiment

In the details of the second embodiment according to the present disclosure, the same components as those in the first embodiment perform the same operation, and thus another description thereof is omitted.

The mounting unit 10 may have a function of flying only by its own aircraft. For example, when an abnormality occurs in the flight vehicle 100, the mounting unit 10 is separated and the mounting unit 10 is made to fly, so that the total weight of the flight vehicle becomes lighter, and it is possible to reduce the impact in the event of a crash.

When the rotary shaft of the rotor blade included in the mounting unit 10 is rotatable, in normal times, the rotatory shaft should be extended in the horizontal direction as shown in FIG. 20. When the mounting unit is separated from the flight vehicle, the rotary shaft is extended in the vertical direction as shown in FIG. 19. While efficiently moving in the XY axes direction during normal times, it is possible to fly by itself in an emergency.

The configuration of the flight vehicle in each embodiment can be implemented by combining a plurality of them. It is desirable to consider an appropriate configuration according to the cost of manufacturing the flight vehicle and the environment and characteristics of the place where the flight vehicle is operated.

The above-described embodiments are merely examples for facilitating the understanding of the present disclosure and are not intended to limit the present disclosure. The present disclosure can be modified and improved without departing from the gist thereof, and it goes without saying that the equivalents are included in the present disclosure.

DESCRIPTION OF REFERENCE NUMERALS

10: mounting unit
11: mounted object (baggage)
12: mounted object holding mechanism
13: mounting unit moving means
20: string member
21: hanging mechanism
22: rotary shaft
23: pulley
24: angle correction unit
25: slit
30: port
31: baggage receiving part
32: support part
33: rotating unit
34: fall prevention member
100: flight vehicle
110*a*-110*d*: propeller
111*a*-111*d*: motor
120: frame
130: landing gear
100: damper
200: building
210: balcony

The invention claimed is:

1. A flight vehicle, comprising:
a mounting unit configured to hold a mounted object; and
a string member configured to connect the mounting unit to a main body of the flight vehicle,
wherein the mounting unit includes a moving means including a plurality of rotor blades provided between the upper end and the lower end of the mounting unit, when the mounting unit is viewed from the side, wherein, when rotary shafts of the plurality of rotor blades extend in a horizontal direction, an angle formed by a rotary shaft of at least one of the plurality of rotor blades and the horizontal axis is smaller than an angle formed by the rotary shaft and a vertical axis, wherein the plurality of rotor blades include three rotor blades, wherein a rotary shaft of one of the three rotor blades extends in a first horizontal direction, and rotary shafts of the other two of the three rotor blades extend in a second horizontal direction crossing the first horizontal direction, and wherein a rotational axis of each of the three rotor blades is oriented horizontally when suspended vertically from the main body.

2. The flight vehicle according to claim 1,
wherein some of rotary shafts of the plurality of rotor blades extend in different directions from each other.

3. The flight vehicle according to claim 2,
wherein the plurality of rotor blades include four rotor blades,
wherein rotary shafts of two rotor blades arranged diagonally with respect to the mounting unit extend in the same direction as each other, and
wherein rotary shafts of two rotor blades adjacent to each other around the mounting unit extend in different directions from each other.

4. The flight vehicle according to claim 1,
wherein the plurality of rotor blades include four rotor blades,
wherein rotary shafts of two rotor blades arranged diagonally with respect to the mounting unit extend in the same direction as each other, and
wherein rotary shafts of two rotor blades adjacent to each other around the mounting unit extend in different directions from each other.

5. The flight vehicle according to claim 1,
wherein the string member is branched into two or more from a predetermined position, and is connected to the mounting unit at two or more points.

6. The flight vehicle according to claim 1,
wherein the mounting unit is hung by the string member connected to a hanging mechanism.

7. The flight vehicle according to claim 6,
wherein the hanging mechanism is mounted at a position offset at least in the front-rear direction of the flight vehicle from the center of gravity of the flight vehicle or directly above the string member extending from the mounting unit.

8. The flight vehicle according to claim 7,
wherein the string member extends from the offset position to the mounting unit via a pulley.

9. The flight vehicle according to claim 1,
wherein the mounting unit is separated from an airframe together with the mounted object.

10. The flight vehicle according to claim 1, wherein the first horizontal direction is a front-rear direction of the mounting unit, and the second horizontal direction is a left-right direction of the mounting unit.

11. A mounting unit that holds a mounted object,
wherein the mounting unit has a moving means including a plurality of rotor blades provided between the upper end and the lower end of the mounting unit, when the mounting unit is viewed from the side, wherein some of rotary shafts of the plurality of rotor blades extend in different directions from each other, wherein, when rotary shafts of the plurality of rotor blades extend in a horizontal direction, an angle formed by a rotary shaft of at least one of the plurality of rotor blades and the horizontal axis is smaller than an angle formed by the rotary shaft and a vertical axis, wherein the plurality of rotor blades include three rotor blades, wherein a rotary shaft of one of the three rotor blades extends in a first horizontal direction, and rotary shafts of the other two of the three rotor blades extend in a second horizontal direction crossing the first horizontal direction, and wherein a rotational axis of each of the three rotor blades is oriented horizontally when suspended vertically from the mounting unit.

12. The mounting unit as in claim 11,
wherein the plurality of rotor blades include four rotor blades,
wherein rotary shafts of two rotor blades arranged diagonally with respect to the mounting unit extend in the same direction as each other, and
wherein rotary shafts of two rotor blades adjacent to each other around the mounting unit extend in different directions from each other.

13. The flight vehicle according to claim 11, wherein the first horizontal direction is a front-rear direction of the mounting unit, and the second horizontal direction is a left-right direction of the mounting unit.

* * * * *